United States Patent
Bassali et al.

(10) Patent No.: US 7,098,671 B2
(45) Date of Patent: Aug. 29, 2006

(54) MICROWAVE MEASUREMENT SYSTEM FOR PISTON DISPLACEMENT

(76) Inventors: Fred Bassali, 150-20 71 Ave. #3F, Kew Gardens Hills, NY (US) 11367; John Cosenza, 944 Skyline Dr., Coram, NY (US) 11727

( * ) Notice: Subject to any disclaimer, the term of this patent is extended or adjusted under 35 U.S.C. 154(b) by 20 days.

(21) Appl. No.: 10/794,426

(22) Filed: Mar. 5, 2004

(65) Prior Publication Data
US 2004/0239339 A1    Dec. 2, 2004

Related U.S. Application Data

(60) Provisional application No. 60/453,082, filed on Mar. 7, 2003.

(51) Int. Cl.
*G01R 27/32* (2006.01)
(52) U.S. Cl. ..................... 324/642; 324/644
(58) Field of Classification Search ............. 324/642, 324/644
See application file for complete search history.

(56) References Cited

U.S. PATENT DOCUMENTS

| 4,749,936 A | * | 6/1988 | Taplin ................. 324/644 |
| 6,445,193 B1 | * | 9/2002 | Trummer et al. ....... 324/644 |

* cited by examiner

*Primary Examiner*—Anjan Deb
*Assistant Examiner*—Timothy J. Dole
(74) *Attorney, Agent, or Firm*—Sofer & Haroun, LLP

(57) ABSTRACT

A microwave measurement system is utilized for the determination of displacement of a piston in a fluid filled cylindrical structure. The piston plus cylindrical encasement of the hydraulic system is modeled as a uniform cylindrical waveguide terminated in a metal plate. A novel shaped probe antenna to measure the slope of the relative phase of the reflected equivalent voltage wave with respect to frequency. The idea to measure the slope of the relative phase is novel and requires a new antenna structure. Instead of using the phase slope with respect to frequency, the total phase shift in a given frequency range is used to determine the location of the piston in the cylindrical chamber. Simulation and measurement will be used to determine the impedance of the antenna as well as the electromagnetic field at different locations inside the cylinder. In addition, the antenna will be analyzed to optimize its design, which ought to result in minimizing the reflections.

6 Claims, 23 Drawing Sheets

Typical System Diagram For Measuring $|r|$ and $\phi'$

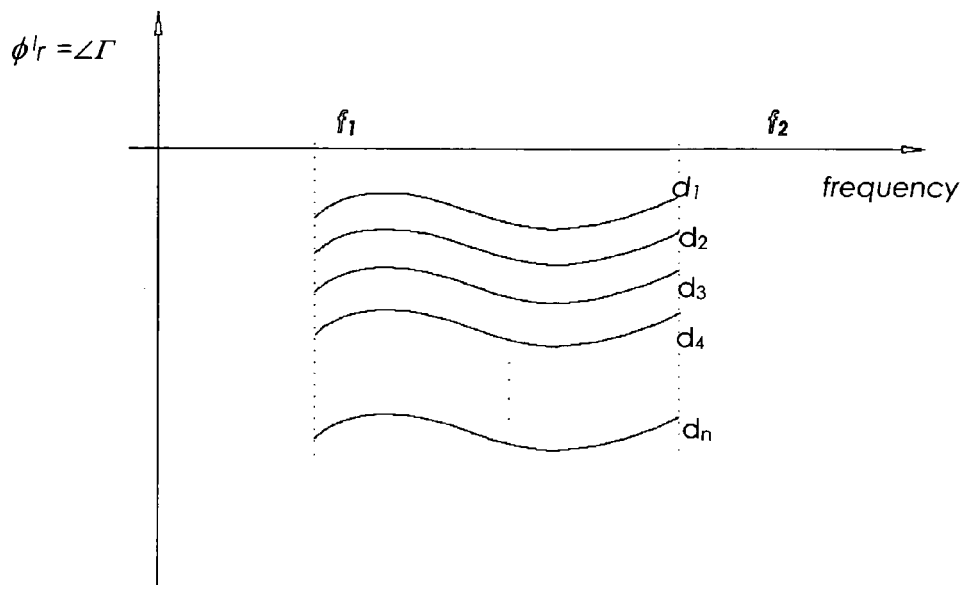
FIG.4 Slope of Phase Angle vs. Frequency at different Piston depths
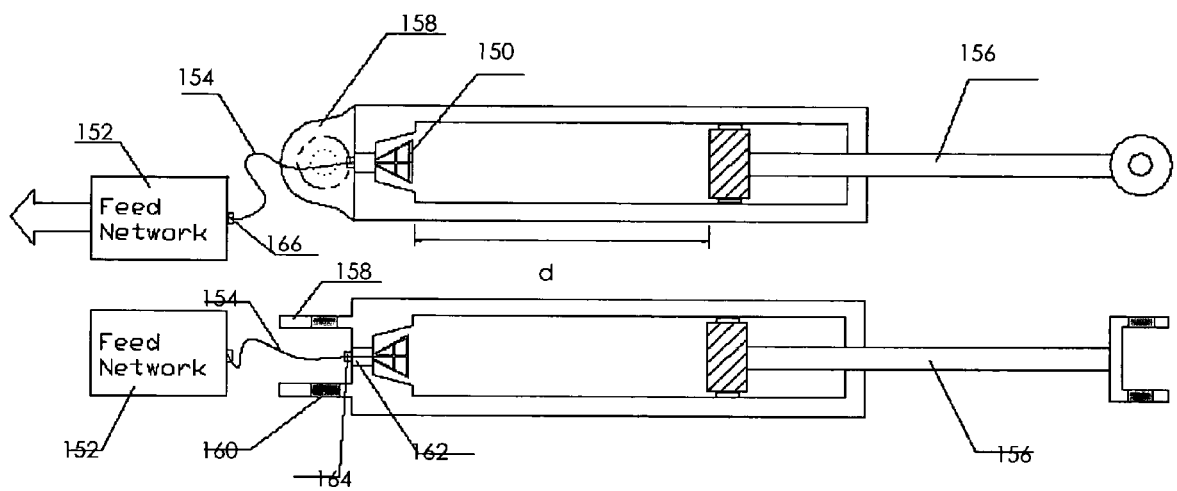
FIG.5

FIG.7 Typical System Diagram For Measuring $|\Gamma|$ and $\phi'$

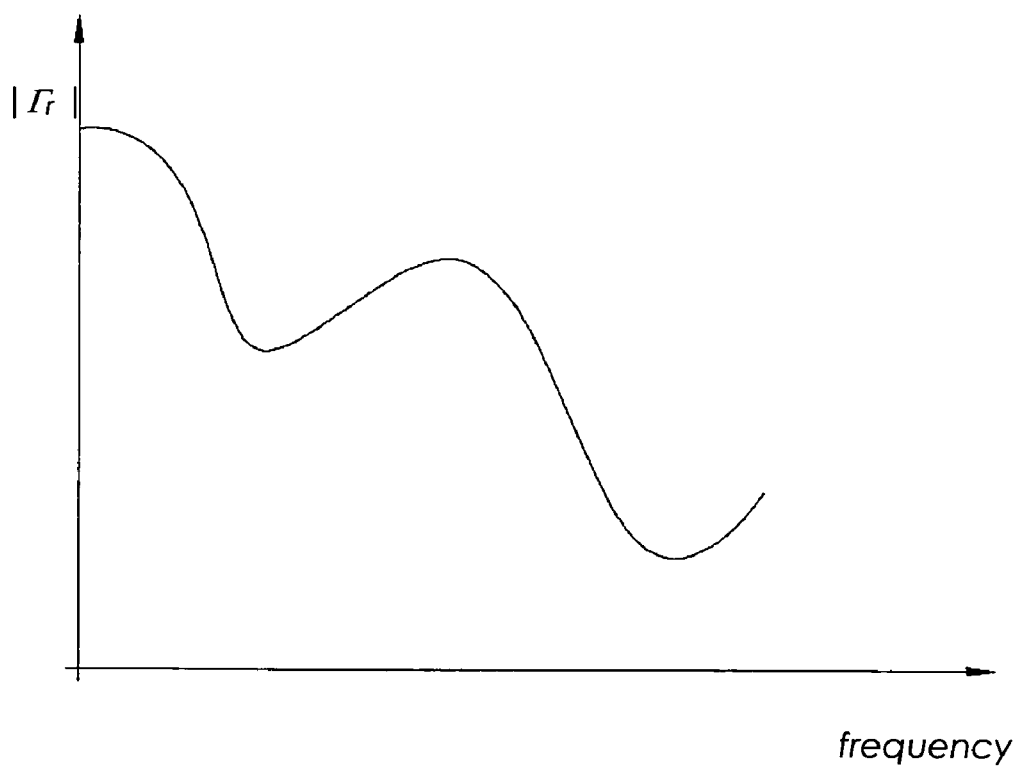
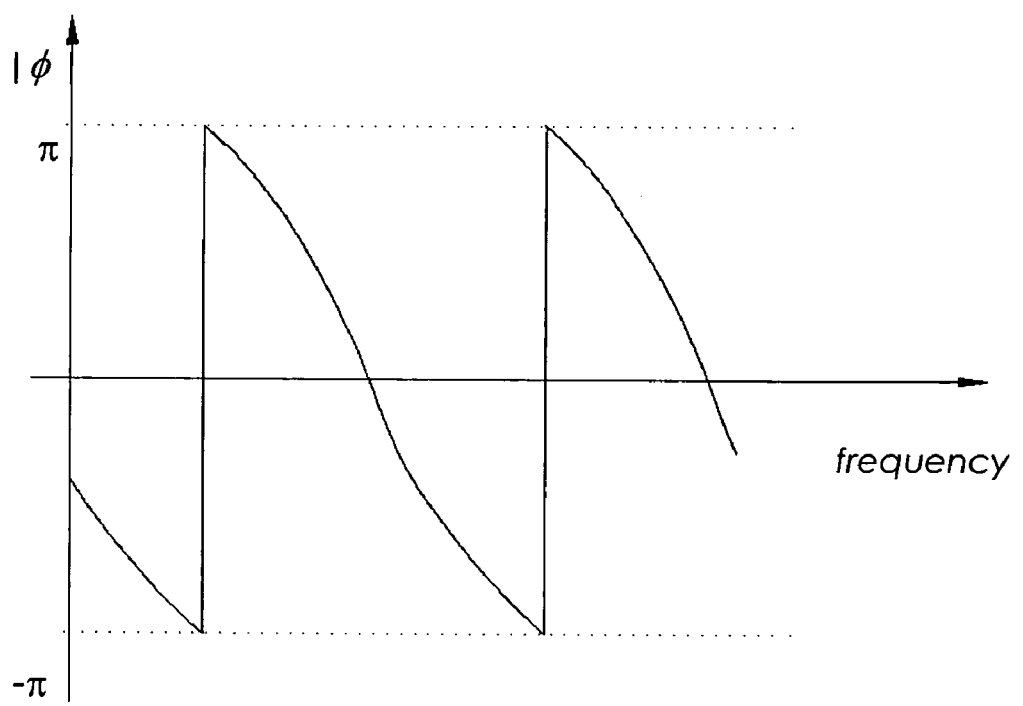
FIG. 9

1. Cross-sectional view
2. Longitudinal view through plane $l$-$l$
3. Surface view from $s$-$s$ 1. Cross-sectional view
2. Longitudinal view through plane $l$-$l$
3. Surface view from $s$-$s$

MICROWAVE MEASUREMENT SYSTEM FOR PISTON DISPLACEMENT

RELATED APPLICATION

This application is related to and claims the benefit of priority from U.S. Provisional Patent Application No. 60/453,082, filed on Mar. 7, 2003, the entirety of which is incorporated herein by reference.

BACKGROUND

Hydraulic systems are typically used to provide strong forces found in heavy-duty machinery. Hydraulic systems are found in heavy construction equipment, such as, cranes, bulldozers, excavators, dump trucks, forklifts, graders, as well as in large agricultural machinery, such as, tractors, combines, etc. The hydraulic/pneumatic systems currently used suffer from a lack of precision in control. Electric motors are often substituted for hydraulic/pneumatic systems in light duty machinery to accomplish precision control. Examples of precision control using electric motors include robots that are used in automobile manufacturing and in circuit board assembly industries. Such robots have sub-millimeter precision and are useful for light-duty applications. Heavy machinery applications typically mandate the use of hydraulic systems; however, exact control usually cannot be achieved Leakage of hydraulic/pneumatic fluid from one side of a piston to the other side results in undesirable movement in machinery, for example, in attempting to steady the position of a fire engine ladder or of a crane during installation of steel beams. A feedback control system in conjunction with an apparatus that senses a piston position could correct the slippage of hydraulic/pneumatic pistons.

SUMMARY

A technique that can provide accurate location of a piston is developed. It uses microwave propagation in hydraulic or pneumatic cylinders. Such a method and apparatus could be used as a sensing system to provide highly accurate position feedback information for hydraulic/pneumatic control system.

A computer controlled system using an accurate sensing device (sensor) in hydraulic/pneumatic cylinders is currently not available but is needed to automate heavy machinery. Instead of the movement of several different control valves, an operator will benefit from a more convenient man machine interface, such as a mouse, touch screen, touch pad, joystick or a keypad for numerical entry. Simultaneous activation of various valves and instantaneous and precise measurements of piston positions with robotic speed significantly reduces the time operators regularly spend on routine operations. For instance, a forklift can be programmed for the appropriate height corresponding to a shipping dock if computer control is implemented.

BRIEF DESCRIPTION OF DRAWINGS

FIG. 4 shows the Slope of Phase Angle vs. Frequency at different Piston depths FIG. 5 shows a Typical System Configuration of the invention showing respectively two views from two different sides.

FIG. 9 shows a Typical Amplitude And Phase of Reflection Coefficient in hydraulic cylinder

DESCRIPTION OF THE PREFERRED EMBODIMENTS

I. Theory of Operation

Figure 1:
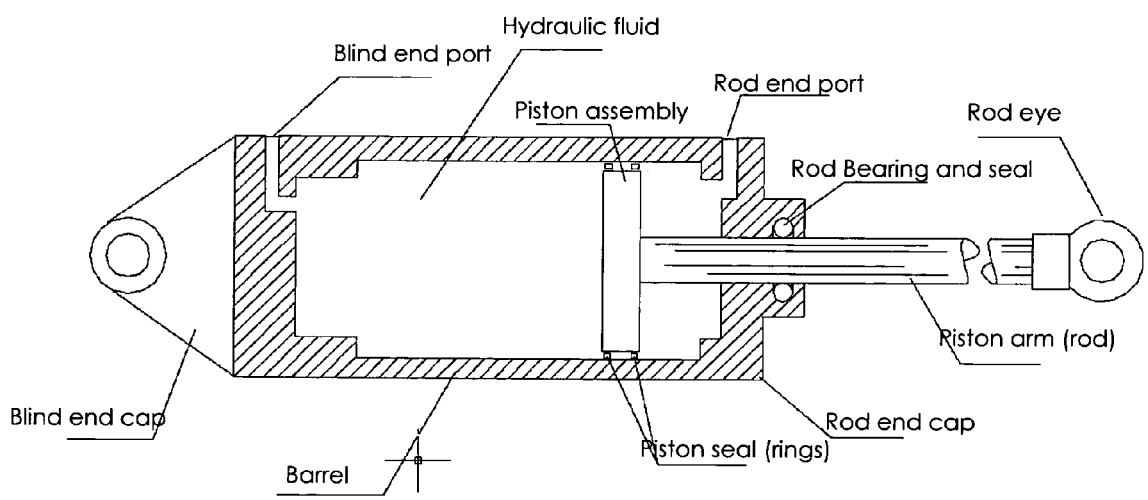
FIG. 1 shows a Double-Acting Cylinder With Hinge Mount.

A detailed description of the theoretical concepts for the analysis and applications of hydraulic systems and their components such as hydraulic pistons, cylinders, pumps and control valves is discussed in ref [1]. FIG. 1 depicts a typical double-acting cylinder with a hinge. As FIG. 1 depicts, one side is a hollow cylinder (blind end) filled with hydraulic fluid (oil) or pneumatic fluid (air). The other side contains a piston arm (rod). The space between the piston arm and the cylinder wall is filled with the same hydraulic fluid. In order to move the arm(s), the hydraulic fluid enters one side and the fluid exits from the other side. The hollow side can be viewed as a uniform cylindrical waveguide with circular cross section.

To estimate the piston's position, waveguide and transmission line theories are utilized. The cylinder functions as a waveguide and the piston functions as an electrical short. The position of the piston in the hydraulic/pneumatic cylinder is determined using the phase of the voltage reflection coefficient versus frequency. Usually, the slope of the voltage reflection coefficient is used. Instead the rate of change of the of phase with respect to frequency, the total phase shift in a given frequency range is used.

Figure 2:
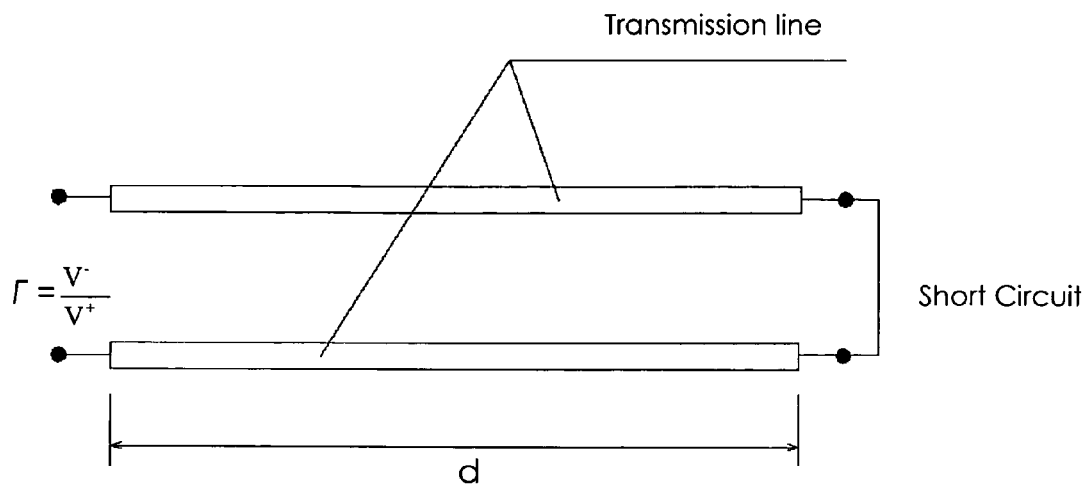
FIG. 2 shows a Transmission Line with a Short Termination.

In a uniform cylindrical waveguide with circular cross section, the guide wavelength depends on the dimensions of the waveguide and the composition of the material that fills the waveguide; this is given by the following equation $$\lambda_{z,mn} = \frac{\lambda}{\sqrt{1-(f_{c,mn}/f)^2}} \quad (1)$$

where $\lambda_{z,mn}$=wavelength in the longitudal or guide direction of the
mn-th waveguide mode of propagation (assumed here to be the z-direction)

m,n=indices identifying the various waveguide modes $\lambda =$ $\frac{c}{f}\frac{1}{\sqrt{\varepsilon_r \mu_r}}$ = intrinsic wavelength of the medium filling the waveguide $f_{c,mn}$=cutoff frequency of the mn-th waveguide mode which depends on the
dimensions of the waveguide and the electrical paramters $\mu$ and $\in$ of the medium filling the waveguide.

f=frequency of the wave $\mu$=permeability of the material that fills the waveguide $\in$=permittivity of the material that fills the waveguide For convenience, (1) is re-written as $$\lambda_{z,mn} = \frac{c}{f\sqrt{\varepsilon_r \mu_r}\sqrt{1-\left(\frac{f_{c,mn}}{f}\right)^2}} \quad (2)$$

where $\in_r$=relative permittivity $\mu_r$=relative permeability which equals unity for non-magnetic material FIG. 2 depicts a standard lossless transmission line. The total phase shift of the voltage reflection coefficient the shorted transmission line of length d is given by $$\angle\Gamma=\phi_r(d,f)=\pi-2\beta_z d \quad (3)$$

where $$\beta_{z,mn} = \frac{2\pi}{\lambda_{z,mn}} \quad (3a)$$

$\beta_z$ is the guide (z-direction)phase constant of the waveguide mode, which by Substituting (3a) into (3) yield $$\phi_r(d,f) = \pi - \frac{4\pi d}{\lambda_{z,mn}} = \pi - \frac{4\pi f d}{v_{pz,mn}} \quad (4)$$

where $v_{pz,mn}$=Phase velocity in the guide for the mn-th waveguide mode of propagation (assumed here to be the z-direction) or $$d = \frac{\lambda_{z,mn}}{4\pi}[\pi - \phi_r(d,f)] = \frac{v_{p,mn}}{4\pi f}[\pi - \phi_r(d,f)] \quad (5)$$

In order to obtain the length of a shorted transmission line d using (5), the measured phase shift $\hat{\phi}_r(d,f)$ in general is insufficient since the instrumentation can only measure phase shifts in the range of $[-\pi, +\pi]$ and for phase shifts that are more than $+\pi$ single frequency phase shift measurement has an ambiguity of $+2k\pi$ for k= . . . −3, −2, −1, 0, +1, +2, +3, . . . . In order to resolve the ambiguity resulting from the limitation of range of $[-\pi, +\pi]$ in the available measurement techniques, one could alternatively measure the slope of the phase shift with respect to frequency i.e., $$\frac{\partial \hat{\phi}_r(d,f)}{\partial f}$$

which equals $$\frac{\partial \phi_r(d,f)}{\partial f}$$

or, alternatively, measure a sweep of phase shifts with respect to frequency.

Figure 3:
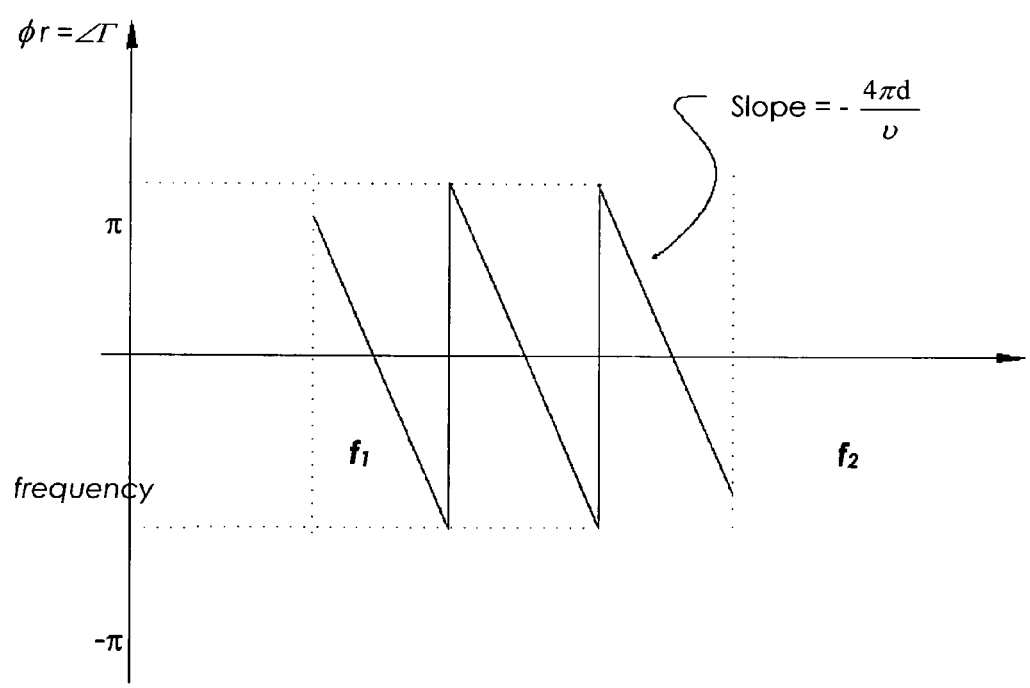
FIG. 3 shows Phase Angle of Reflection Coefficient ∠Γ versus Frequency for a shorted Transmission line
Figure 6:
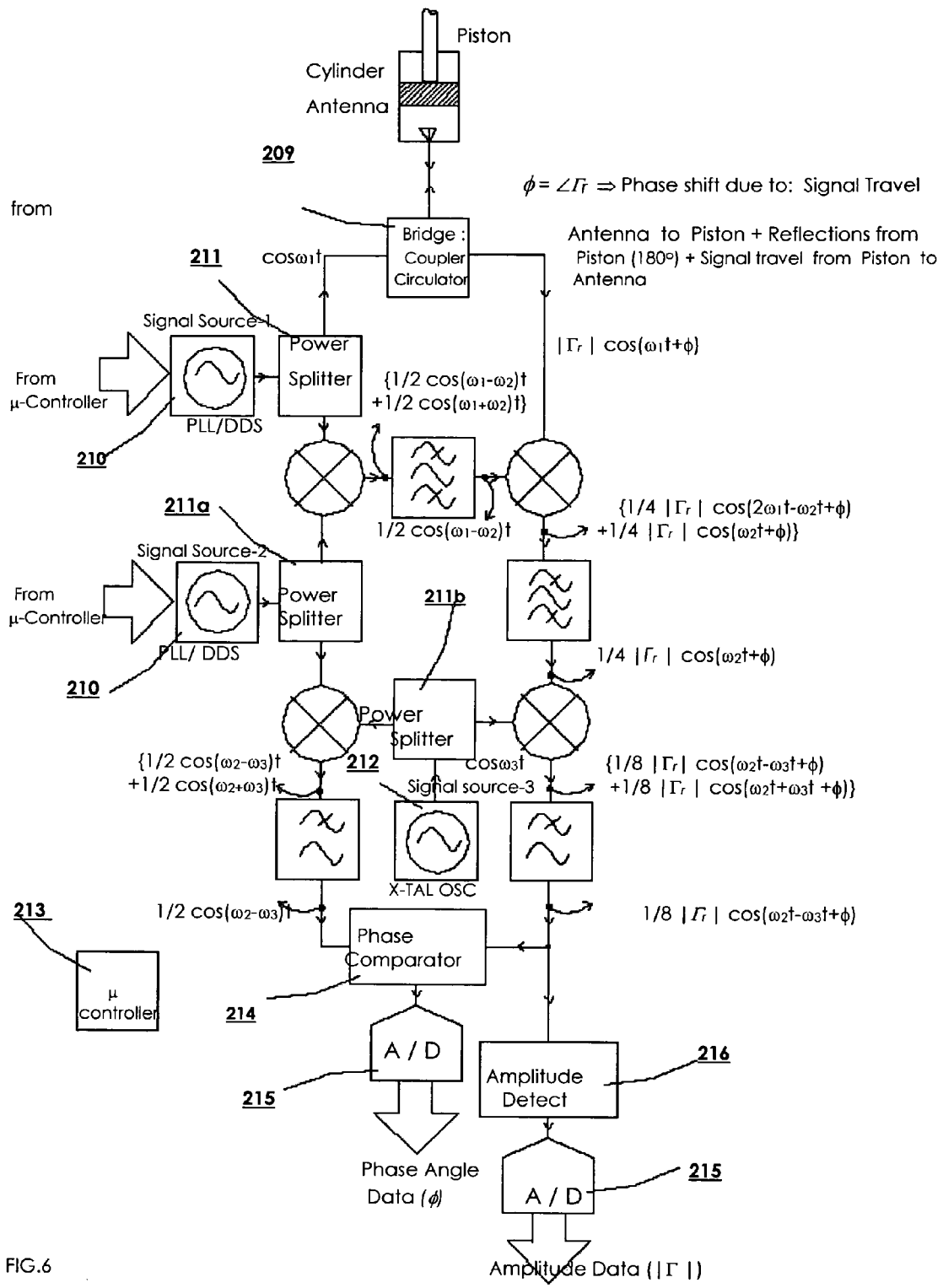
FIG. 6 shows a Typical System Diagram For measuring |Γ| and φ with multiple down conversion.
Figure 7:
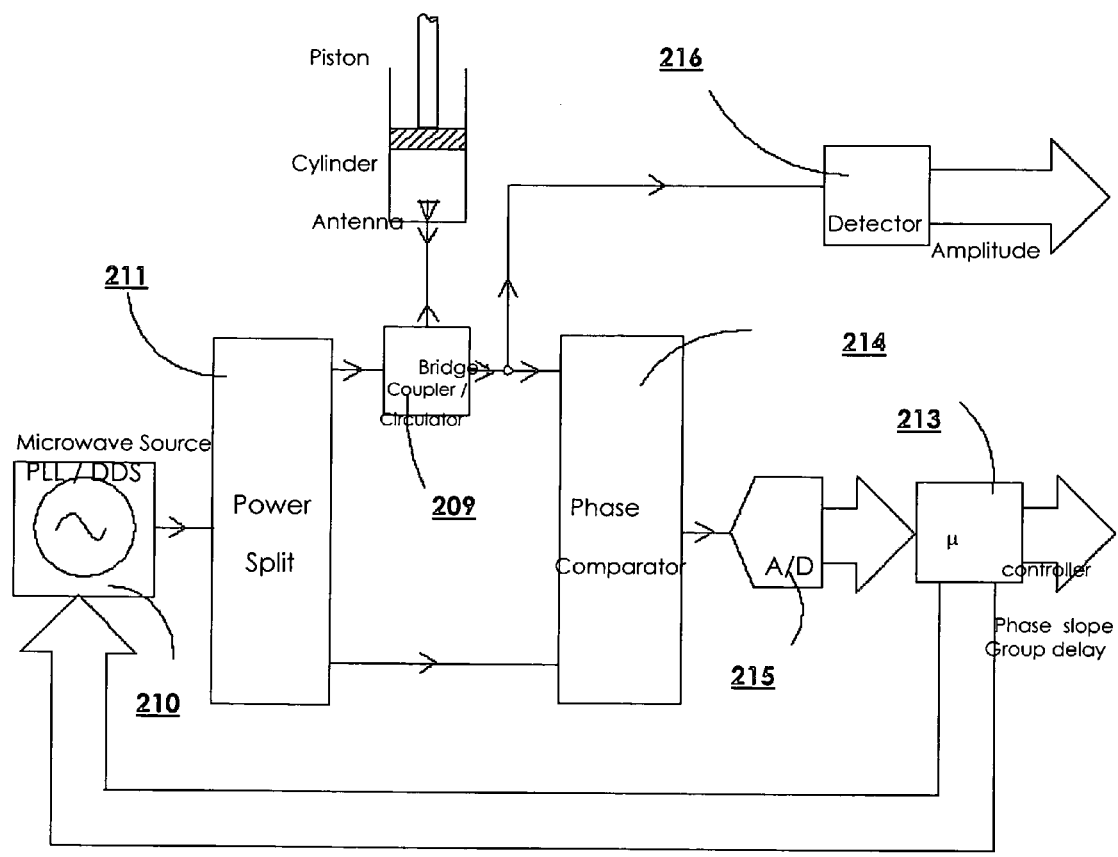
FIG. 7 shows a Typical System Diagram For Measuring |Γ| and φ'.

FIG. 3 is a plot of frequency sweep of the phase angle of the voltage reflection coefficient $\phi_r(d,f)$ for a shorted transmission line.

Another approach for the determination of the length d of the shorted transmission line is accomplished by using the phase slope of the reflection coefficient with respect to frequency. By taking partial derivative with respect to frequency on both sides of (4) we obtain $$\frac{\partial \phi_r(d,f)}{\partial f} = -4\pi d \frac{\partial\left(\frac{f}{v_{p,mn}}\right)}{\partial f} \quad (6)$$

In a hollow waveguides filled with dielectric material, the phase velocity for the mn-th waveguide mode of propagation (assumed here to be the z-direction) is given by[1]

$$v_{pz,mn}=\lambda_{z,mn} f \quad (7)$$

where $v_{pz,mn}$=phase velocity in the waveguide associated with modes m and n

[1] A detailed description of the theoretical concepts for the analysis of the fields in cylindrical waveguides may be found in ref [2].

Using (2) in (7) yields $$v_{pz,mn}(f) = \frac{c}{\sqrt{\varepsilon_r \mu_r} \sqrt{1 - \left(\frac{f_{c,mn}}{f}\right)^2}} \quad (8)$$

where the cutoff frequency $f_c$ for circular waveguide is given by $$f_{c,mn} = \frac{X'_{mn}}{2\pi a \sqrt{\mu \varepsilon}} \quad (9)$$

$$f_{c,mn} = \frac{X_{mn}}{2\pi a \sqrt{\mu \varepsilon}} \quad (10)$$

with $X'_{mn}$=n-th zero (n=1, 2, 3, . . . ) of the derivative of the Bessel function $J_m$ of the first kind of order (m=0, 1, 2, 3, . . . ) which is used for TE modes.

Values corresponding to various indices of $X'_{mn}$ are provided in page 472 of reference [2].

$X_{mn}$=the n-th zero (n=1, 2, 3, . . . ) of the Bessel function $J_m$ of the first kind of order (m=0, 1, 2, 3, . . . ) which is used for TM modes.

Values corresponding to various indices of $X_{mn}$ are provided on page 478 of the reference [2].

substituting (8) into (6) one can obtain $$\frac{\partial \phi_r(d, f)}{\partial f} = \phi'_r \quad (11)$$

$$= -\frac{4\pi d \sqrt{\varepsilon_r \mu_r}}{c} \frac{\partial \left(f \sqrt{1 - \left(\frac{f_c}{f}\right)^2}\right)}{\partial f}$$

$$= -\frac{4\pi d \sqrt{\varepsilon_r \mu_r}}{c} \left(\sqrt{1 - \left(\frac{f_c}{f}\right)^2} + \frac{f_c^2}{f^2 \sqrt{1 - \left(\frac{f_c}{f}\right)^2}}\right)$$

From (11)

$$d = -\frac{\phi'_r \cdot c}{4\pi} \cdot \sqrt{\frac{1}{\mu \varepsilon}} \cdot \frac{1}{\sqrt{1 - \left(\frac{f_c}{f}\right)^2} + \frac{f_c^2}{f^2 \sqrt{1 - \left(\frac{f_c}{f}\right)^2}}} \quad (12)$$

$$d = \frac{t_{gd} \cdot c}{2} \cdot \sqrt{\frac{1}{\mu \varepsilon}} \cdot \frac{1}{\sqrt{1 - \left(\frac{f_c}{f}\right)^2} + \frac{f_c^2}{f^2 \sqrt{1 - \left(\frac{f_c}{f}\right)^2}}} \quad (13)$$

where $t_{gd}$ is the group delay given by $$t_{gd} \equiv -\frac{\partial \phi_r}{\partial \omega} = -\frac{\partial \phi_r}{2\pi \partial f} \quad (14)$$

In an alternative methodology, a phase sweep in the frequency range of $[f_1, f_2]$ can be used. Using (4)

$$\phi_r(d, f_2) - \phi_r(d, f_1) = \frac{4\pi f_1 d}{v_{pz,mn}(f_1)} - \frac{4\pi f_2 d}{v_{pz,mn}(f_2)} \text{ or} \quad (15)$$

$$d = \frac{\phi_r(d, f_2) - \phi_r(d, f_1)}{\frac{4\pi f_1}{v_{pz,mn}(f_1)} - \frac{4\pi f_2}{v_{pz,mn}(f_2)}} \quad (16)$$

FIG. 4 depicts typical curves for the slope of the phase angle of the voltage reflection coefficient $\phi'_r$ versus frequency f. Once a value for the slope of the phase angle $\phi'_r$ or time delay $t_{gd}$ is determined, the piston distance d can be determined from (14) or (15) or utilizing curves such as those in FIG. 4 or by a table-lookup.

Implementation

Figure 10:
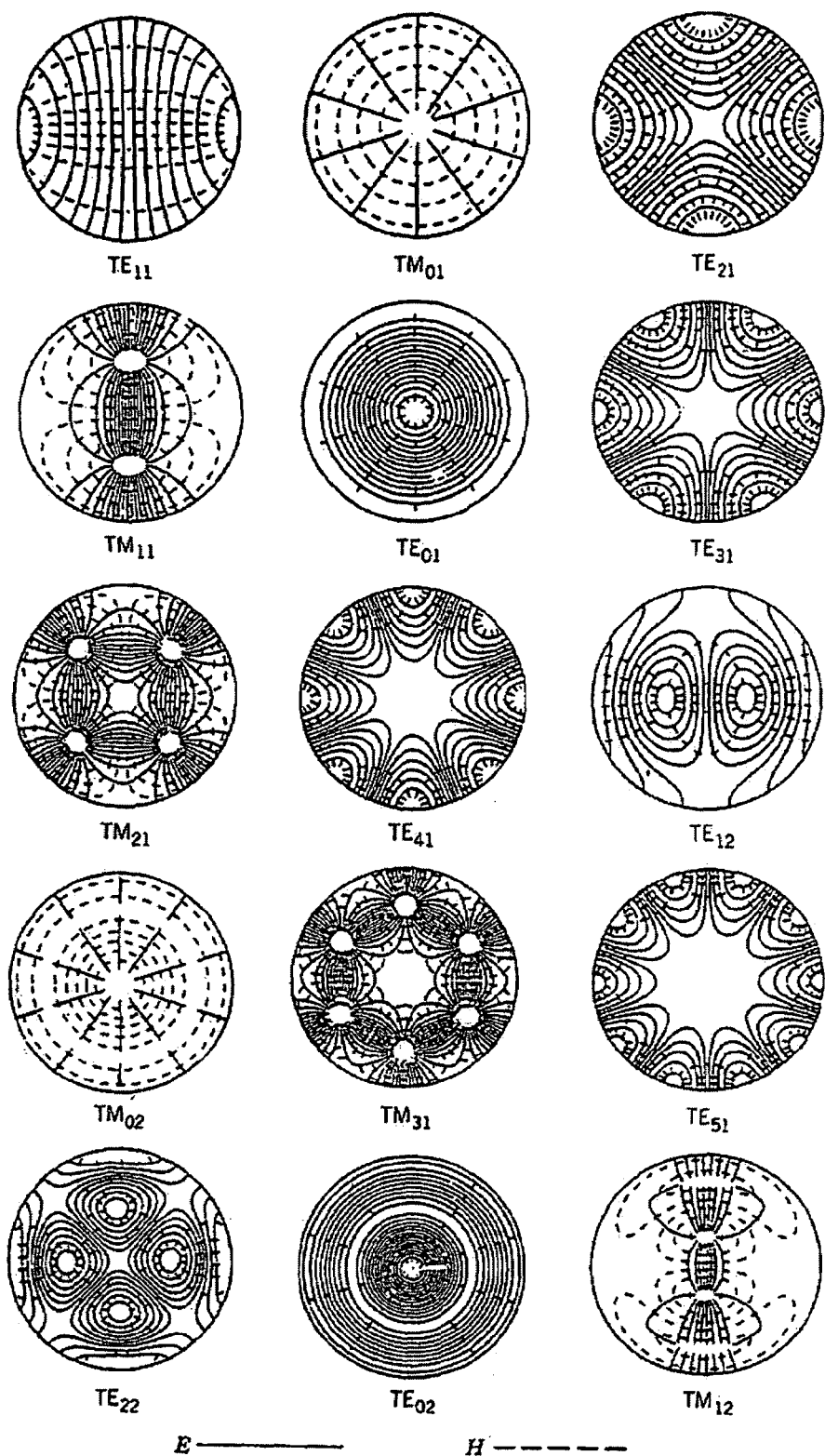
FIG. 10 shows a Field configurations, first is $TE^z$ and/or $TM^z$ modes in a circular waveguide
Figure 11:
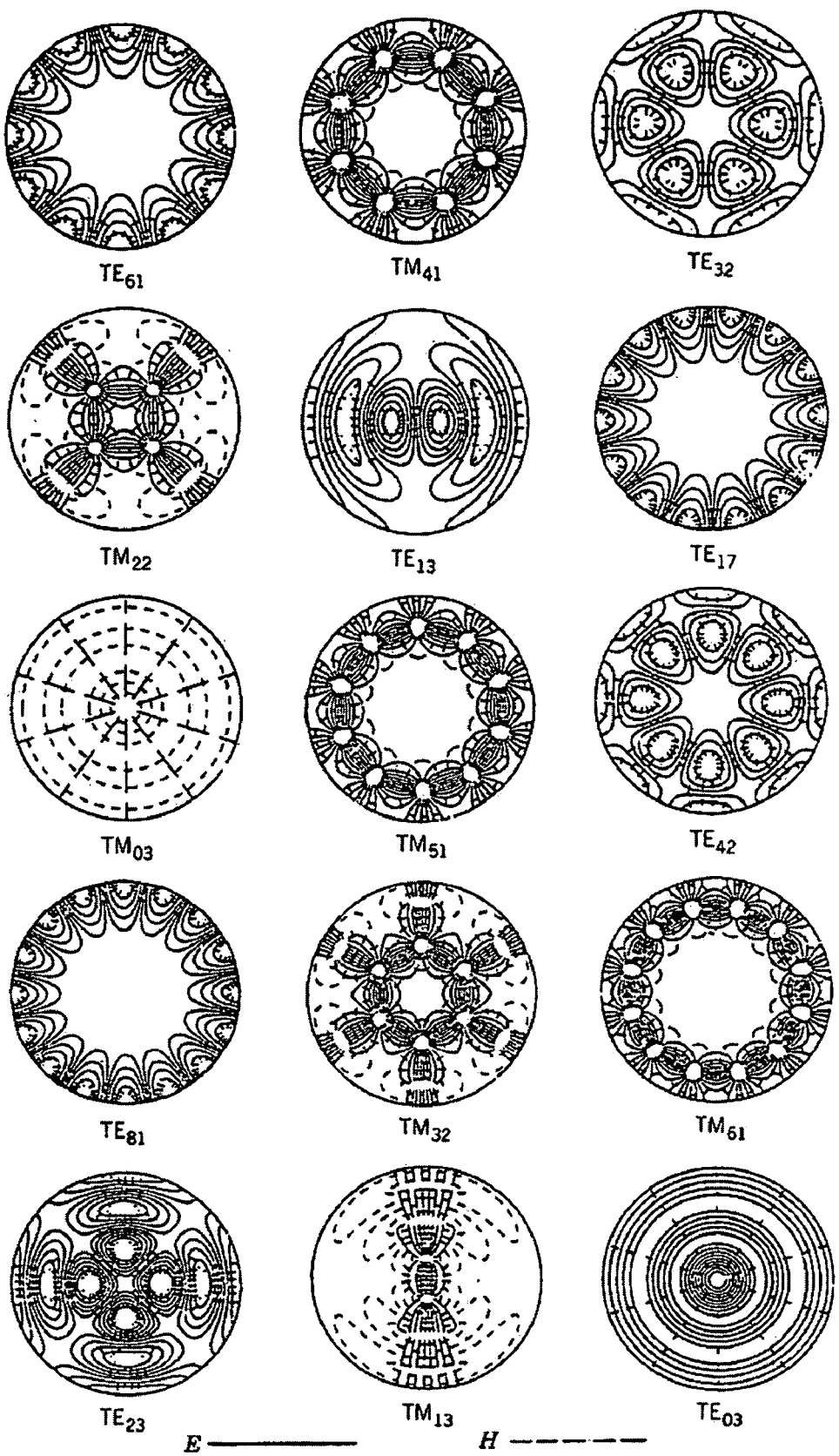
FIG. 11 shows a Field configurations, additional 15 $TE^z$ and/or $TM^z$ modes in a circular waveguide
Figure 15A:
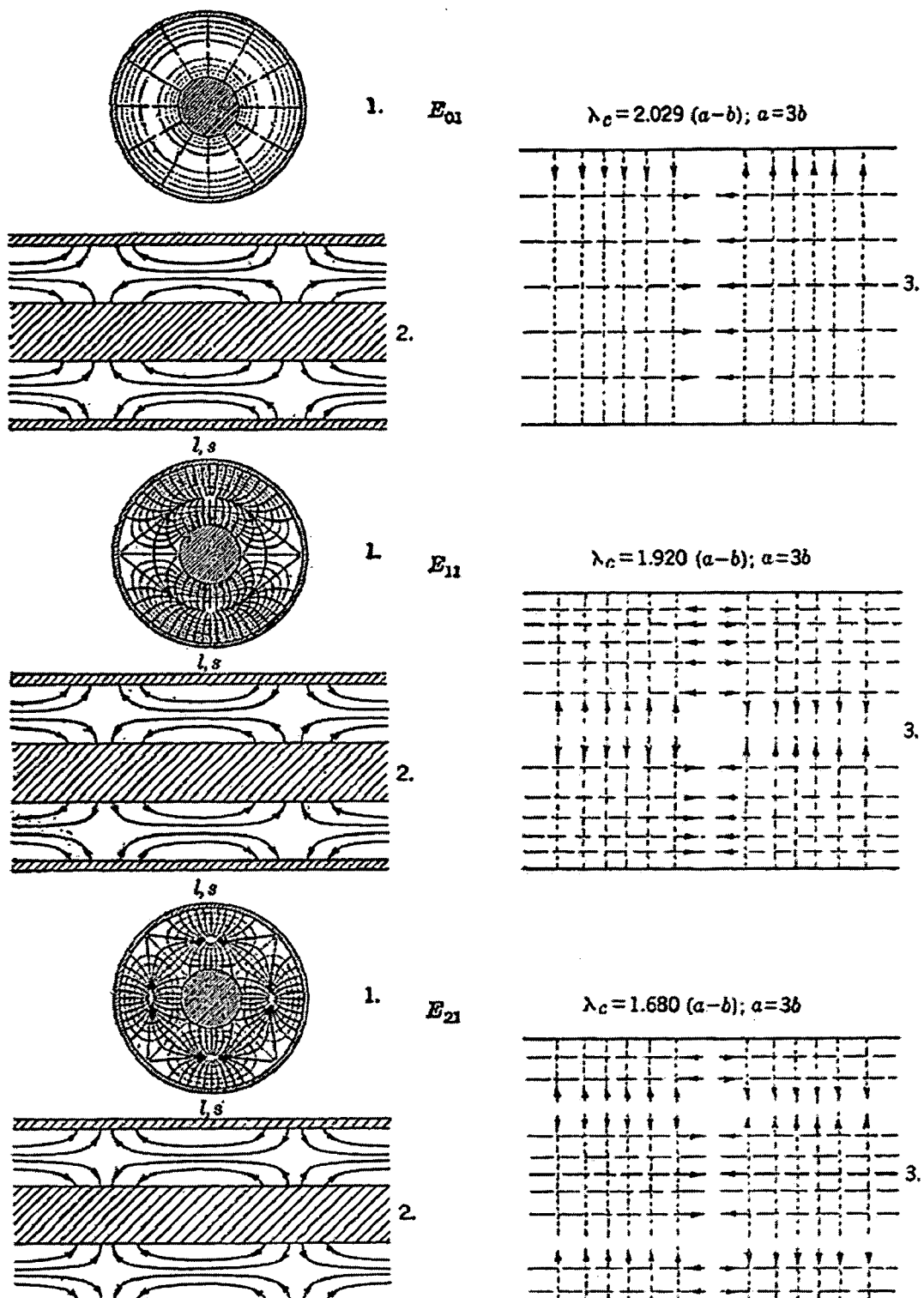
FIG. 15a shows the Field configurations for $TM^z$ modes in a coaxial waveguide
Figure 15B:
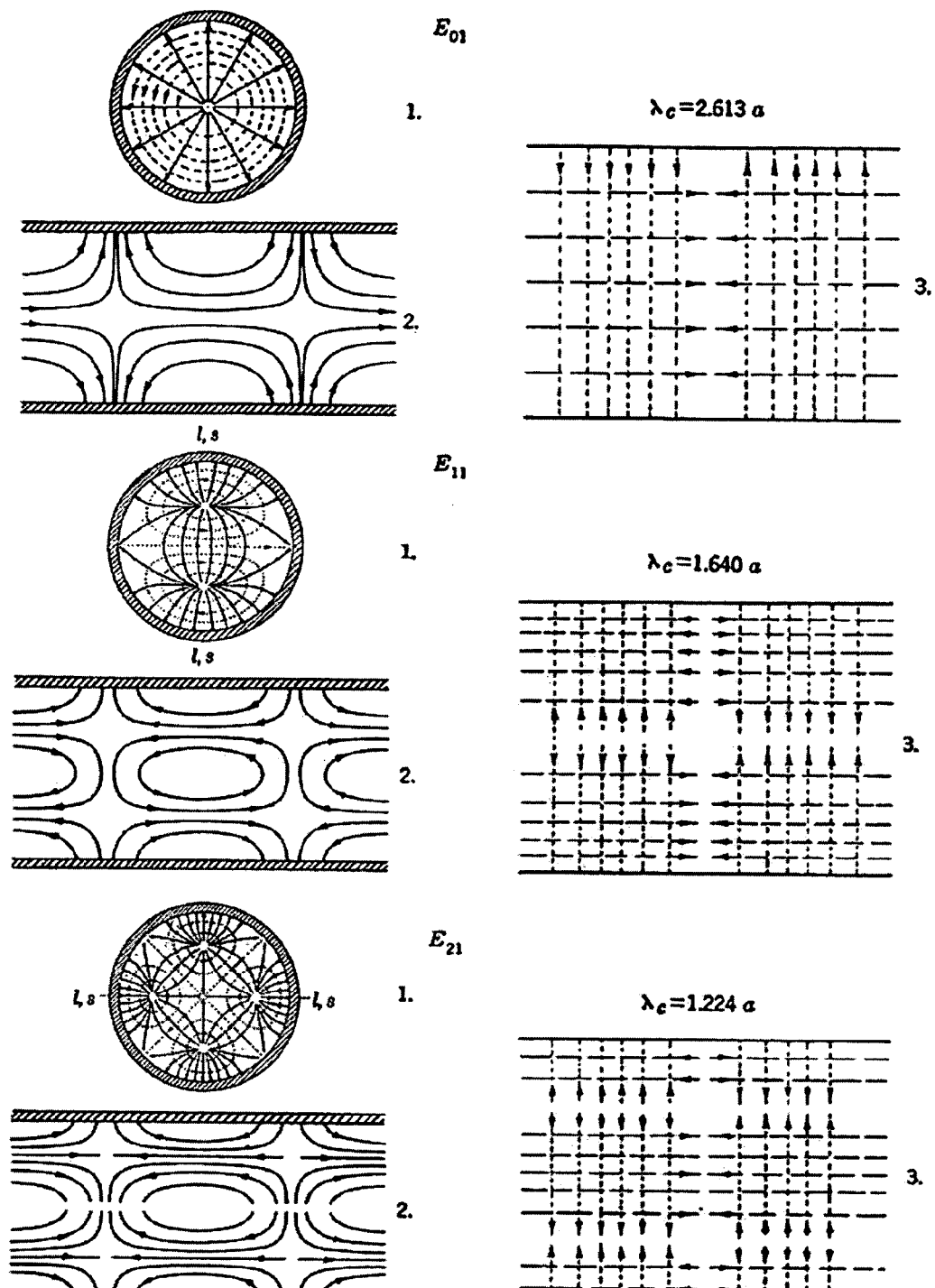
FIG. 15b shows the Field configurations for $TM^z$ modes in a circular wave-guide

FIGS. 10, 11, and 15b depict the field lines of lower order modes in the cross section of a hollow cylindrical waveguide; these correspond to the hollow side of hydraulic/pneumatic cylinder.

Figure 14:
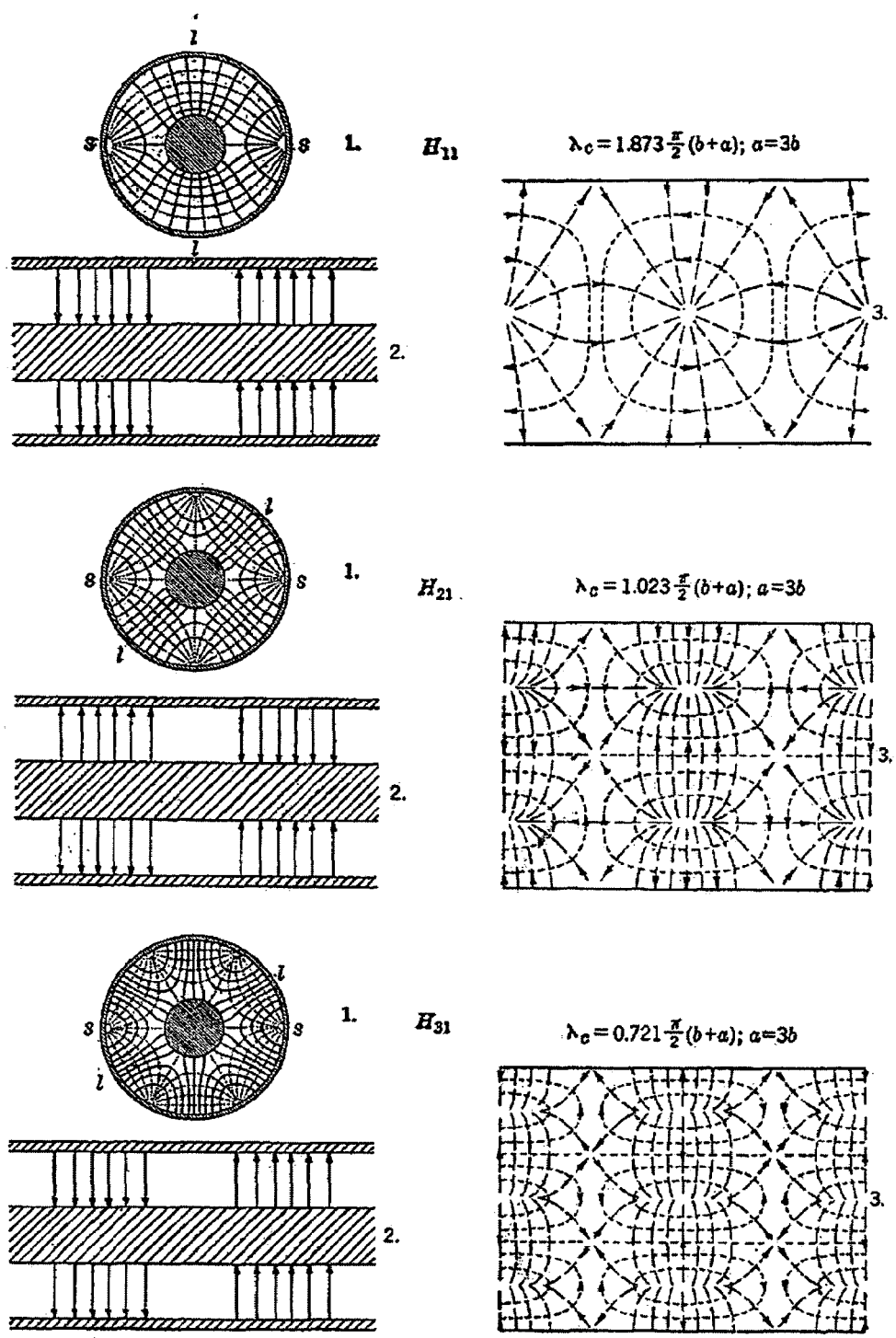
FIG. 14 shows the Field Configurations for $TE^z$ modes in a coaxial waveguide

FIGS. 14, 15a depict field lines of the lower order modes of a coaxial waveguide; these correspond to the side of cylinder hydraulic/pneumatic containing the piston arm. Either side can be used as the waveguide region. However, due to presense of less available space in chamber which contains the piston arm the hollow side is usually preferable for placing an antenna.

As shown in FIG. 5 the antenna 150 is placed at the blind end of metallic cylindrical chamber. According to this embodiment the feed network 152 connects via radio frequency connector 166 and cable 154 and radio frequency connector 162 through coaxial section 162 to the antenna 150. According to this figure the cable 154 passes through the space between the hinges 158 and 160 of the blind end cap and connects to radio frequency connector 162 as the piston 165 and the piston arm 156 moves the distance d which is the distance between the antenna 150 and piston 160 changes. The feed network 152 is typically a one port network analyzer. FIGS. 6, 7, 8 and 22 are typical implementation of such one port network analyzer systems. The network analyzer determines the electrical length of the cylinder between the antenna 150 and piston 165. The electrical length of the cylinder, i.e., the electrical distance from a reference point at the antenna 150 to the piston 165 is determined by using the measured phase versus frequency information as described above. The electrical lengths of the connecting cable 154 and radio frequency connectors 158 and 164 are known and are subtracted from the actual measurements. The cutoff frequency $f_c$ is calculated by (9) or (10) by inputting values for the inner radius α of the cylinder and the relative permittivity $\in_r$ and permeability $\mu_r$ of the fluid filling the cylinder. The piston depth d is calculated from any of equations (12), (13) or (16).

Figure 23:
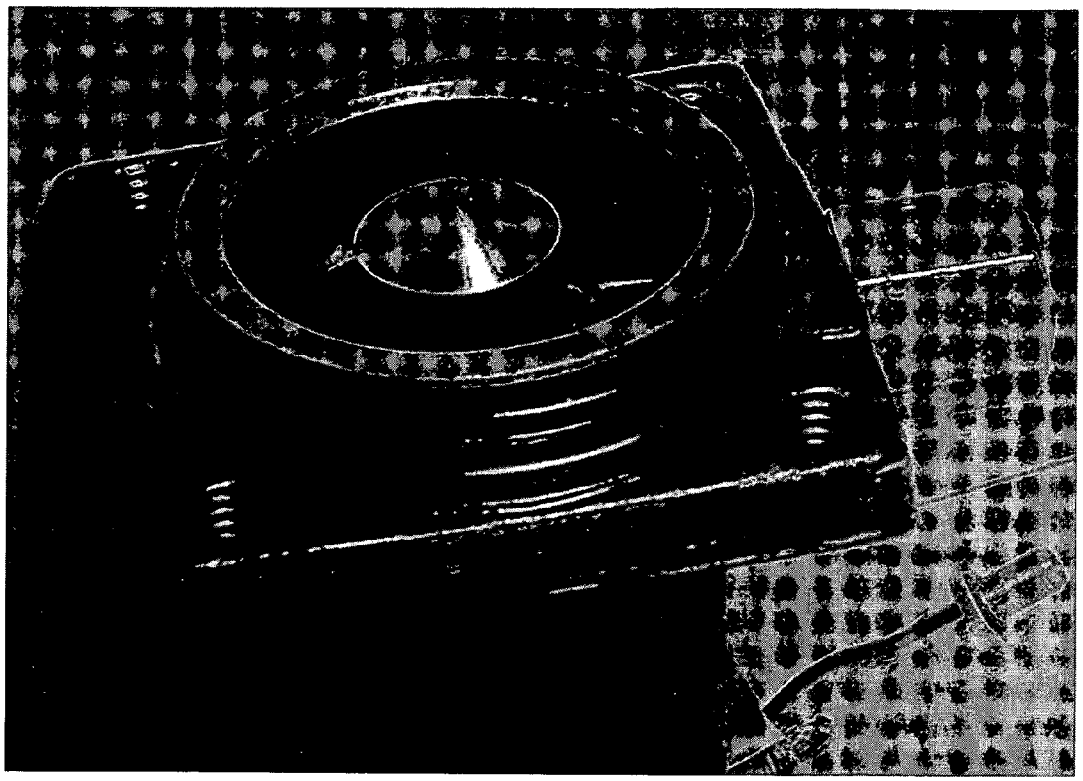
FIG. 23 shows a Typical cylinder head with an antenna installed in it.

Alternatively, the antenna can be installed on the arm end utilizing coaxial waveguide modes. In that case the field lines have to match the field lines of FIGS. 14 and 15. For example for $E_{11}$ mode as in FIG. 15*a* an antenna implementation is composed of two rods located at the nodes of field lines. FIG. 23.

The antenna is connected to circuitry that measures the voltage reflection coefficient Γ (both in magnitude and phase). The phase slope with respect to frequency, is calculated and is proportional to the group delay. The phase non-linearity causes uncertainty in the measurements. The non-linearity data (shown in FIG. 4) is obtained when the piston is at a known distance d, (e.g., when the arm is extended all the way out). At these same points, the phase slope measurements $\phi'_r(d,f)$ are also obtained and stored in computer memory by the software.

FIGS. 6, 7, 8 and 22 depict the block diagrams for various implementations of one port network measurements. Both the phase angle and the magnitude of voltage reflection coefficient are measured. The magnitude of the reflection coefficient (return loss) |Γ| predict the loss tangent $\in''$ of the hydraulic fluid. By incorporating the loss tanget in the formulation i.e. substituting $\in_r = \in' - j\in''$ the above equations more measurement accuracy is obtained.

Figure 8:
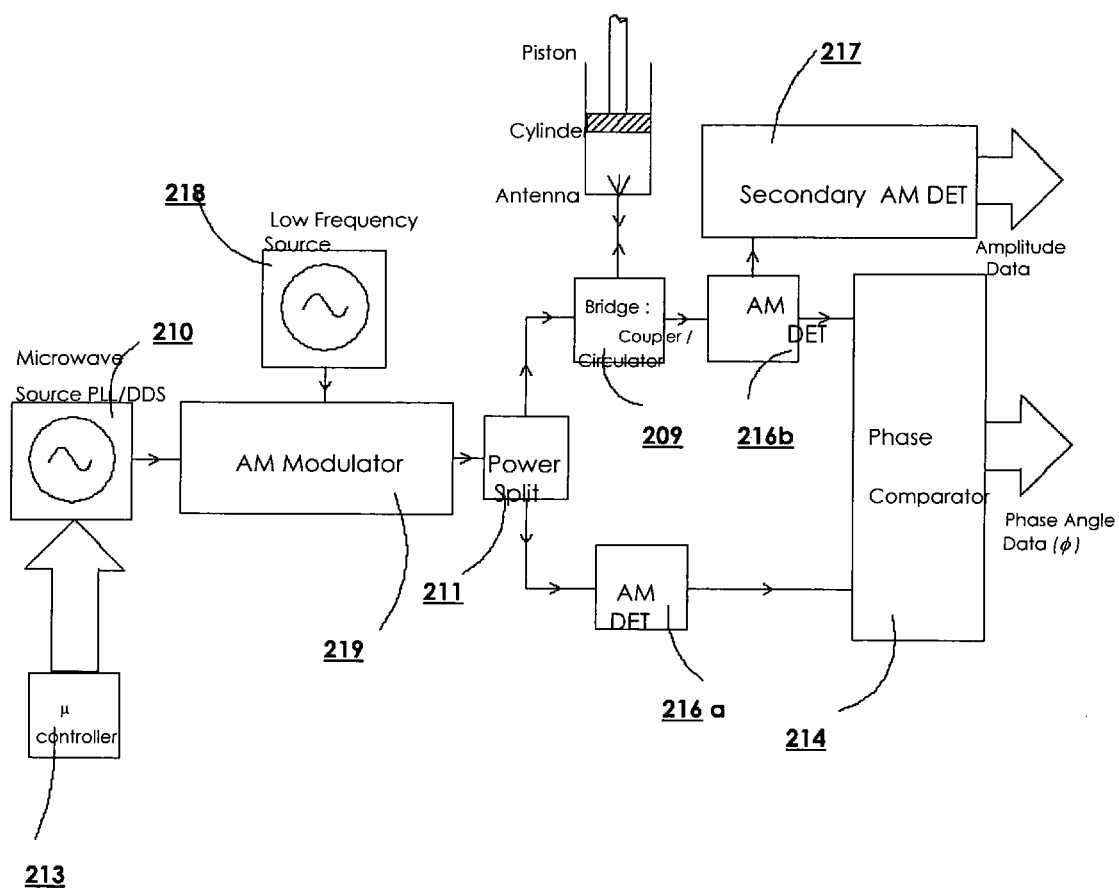
FIG. 8 shows a Typical System Diagram Using Amplitude Modulation Technique

FIGS. 6, 7, 8 and 22 depict four possible methods (amongst a variety of possible techniques) for the measurement of the magnitude, phase angle and its derivative with respect to frequency, i.e., the phase slope $\phi'_r(d,f)$ or the group delay $t_{gd}$ of the voltage reflection coefficient for different piston depths at different frequencies. In FIG. 8 the phase slope or equivalently the group delay is measured directly by means of amplitude modulation techniques. The high frequency carrier signal that is amplitude modulated by a low frequency "base-band" signal and the delay in the base-band incurred as a result of passing through the cylinder under the test is measured.

As in FIGS. 6, 7, 8 and 22 indicated, the signal from the source circuitry 210, 210*a* [such as a phase-locked loop (PLL) or direct digital synthesis (DDS) device or combination of both] is coupled to a port of a three port directional device 209 such as a bridge e.g., a directional coupler or a circulator. The other port is connected to the antenna mounted in the cylinder. The signal is coupled into the cylinder and reflected by the piston. The reflected signal is coupled back to the device and is coupled to its third port. By utilizing such directional three-port devices 209, the reflected wave from the cylinder-piston is separated from the incident wave. The phase of the reflected signal is compared to the phase of the incident signal either at the radio frequency or a lower frequency using a phase comparator 214 in order to obtain the phase angle of the voltage reflection coefficient, $\phi_r(d,f)$. The ratio of the amplitude of the reflected signal to the amplitude of the incident reference (signal source) yields the magnitude of voltage. When the measurements are repeated for different frequencies, the piston location is determined using (12), (13) or (16). The frequency selection is controlled by micro-controller 213. In another system configuration such as FIG. 7 the micro-controller 215 handles the calculation of phase slope from the measured phase in addition to controlling the frequency of the source. According to another embodiment as described in FIG. 8 the phase slope or equivalently the group delay can be calculated utilizing amplitude modulation. A low frequency signal source 218 provids the baseband signal to a carrier frequency generated by microwave signal source 210 using amplitude modulator 219. The modulated signal is then splited into two separate signals by power splitter 211. One branch of the splited signal feeds the AM detector 216*a* and detects the baseband signal which inturn feeds on input of phase comparator 214. The other branch of the splited signal from power splitter 211 feeds the first port of directional device 209. The signal from the second port of the directional device 209 via connectors and cable couples a signal to the antenna in the cylinder. The reflected signal from the couples back from the cylinder to the second port of directional device 209 and in turn the signal is coupled out from the third port of directional device 209 to AM detector 216*b* which feed the input port of the phase comparator 214 The phase comparator then provides the phase difference and or the group delay. The AM detector 216 feeds a secondary AM detector 217 in order to obtain the magnitude of the reflection coefficient. In another implementation according to FIG. 22, microprocessor 226 controls the frequency of signal source 210 which feeds the power splitter 211. One port of the power splitter 211 feeds port one of a directional device 229 and then the signal from its second port is coupled to cylinder and then reflected back by the piston in turn coupled back to the second port of directional device 229 and then coupled out from the third port of directional device 229 feeding an attenuator 228 and in turn feeding the RF ports of two frequency mixers which operate as phase detectors. The other port of power splitter 211 feeds a quadrature device which provides a 90° phase shift between its outputs feeding the LO ports of the of two frequency mixers. The IF ports of the of two frequency mixers provides the I and Q channels of the reflection coefficient Γ in turn are digitized via analog to digital converters 215*a,b* which in turn feeding a digital signal processor or micro-processor 226. The micro-processor calculates the phase difference and subsequently calculates the distance according to one of the formulations mentioned above and outputs the measured distance d.

Antenna Implementation

Typically antenna design is implemented by use of a rod serving as the center conductor of a quarter wave coaxial transformer matching the input impedance (typically 50 Ω) to the wave impedance of the waveguide. Since the wave impedance of the hollow portion of the waveguide is known, the wave impedance of the coaxial portion is determined. y Non-Idealistic Behavior of System Components Ideal transmission lines exhibit a constant delay versus frequency and thereby results in a linear phase versus frequency characteristic. However, waveguides deviate from ideal transmission lines and have dispersive characteristics with respect to frequency as is evident by the phase velocities being frequency dependent; (5). Other effects such as mismatches in various components of the system, e.g., the antenna, connectors and parasitic capacitances, result in additional phase non-linearities. The piston is not a perfect short due to the fact that it has recessed rings acting as capacitors. The lossy nature of the hydraulic fluid causes additional dispersion. In addition, the non-linear effects due to the presence of antenna evanescent modes are more significant when the piston is close to the antenna. Due to the non-zero loss tangent of the hydraulic fluid and the finite conductivity of the metallic portions of the system, the magnitude of the reflection coefficient is less than unity. Hence, the phase versus frequency characteristics are not linear. FIG. 9 depicts typical phase and amplitude versus frequency characteristics of the voltage reflection coefficient for a typical hydraulic cylinder.

Antenna Mode of Operation

Figure 12A:
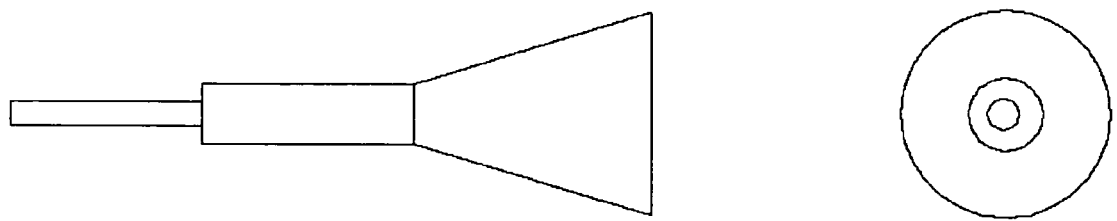
FIG. 12a shows a Solid Antenna For TM01 Mode
Figure 12B:
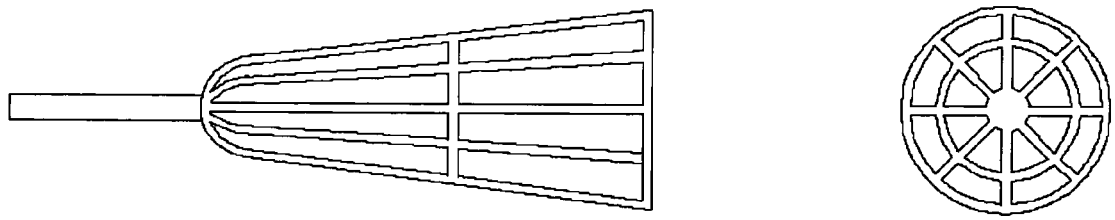
FIG. 12b shows a Wire Mesh Antenna For TM01 Mode

FIGS. 10 and 11 depict the cross-sectional field configuration of the first 30 $TE^z$ and/or $TM^z$ modes of aa uniform cylindrical waveguide incorporated in here from reference [2]. A preferred implementation of the apparatus for hydraulic cylinder depth measurement occurs when placing the antenna in the hollow side of the cylinder and utilizing the $TM_{01}$ mode of a circular waveguide. This modal selection is due to the similarity of the field lines of the $TM_{01}$ mode in a hollow cylindrical waveguide to the field lines of a coaxial transmission lines. The electric field lines are radial and the magnetic field lines are composed of concentric circles; there are no nulls in the field distributions along the radius. FIGS. 12-a and 12-b depict the novel geometrical construction of the antenna choice to produce the needed $TM_{01}$ modes. In FIG. 12-a, the antenna is implemented using solid metal. The far right portion of the antenna is tapered. The tapered shape provides a radial component of the electric field only at the center to be zero as the field configuration for $TM_{01}$ mode (FIG. 10). This is done in order to minimize excitation of waveguide evanescent modes which their presence at the close proximity of the antenna would interfere when the piston gets close to the antenna. In FIG. 12-b, the rigid wires forming a mesh structure are utilized for the construction of the antenna. This type of antenna produces more evanescent mode fields since it does not have the tapered tip. Other modes of operation can be implemented by antennas made of multiple conductor.

Figure 13A:
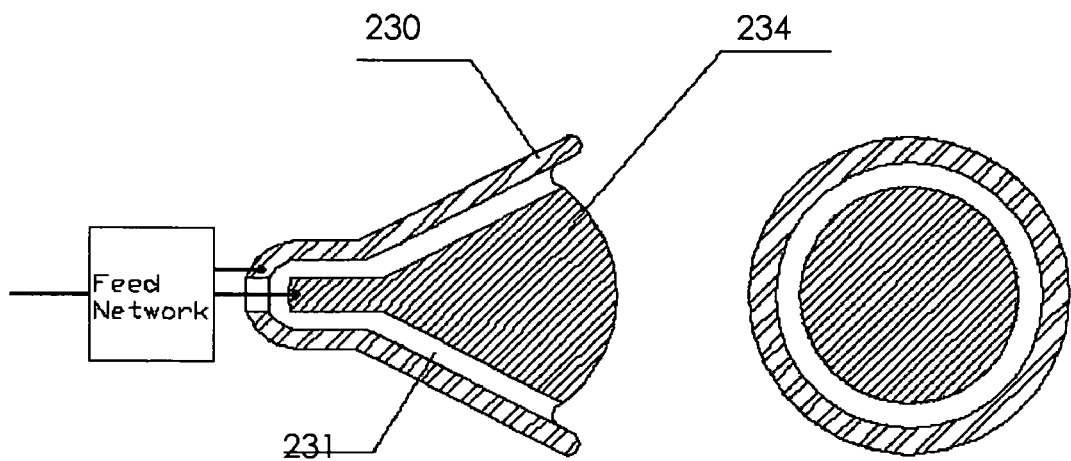
FIG. 13a shows a Antenna For TM02 Mode

FIG. 13a depicts the views of the cross sections of the side and the front of an antenna for generating TM02 mode which corresponds to the field configuration for the TM02 as depicted in FIG. 10 The inner conductor 234 is separated from the outer conductor 230 via insulator 231. The conductors 230 and 231 are fed with a feed network.

Figure 13B:
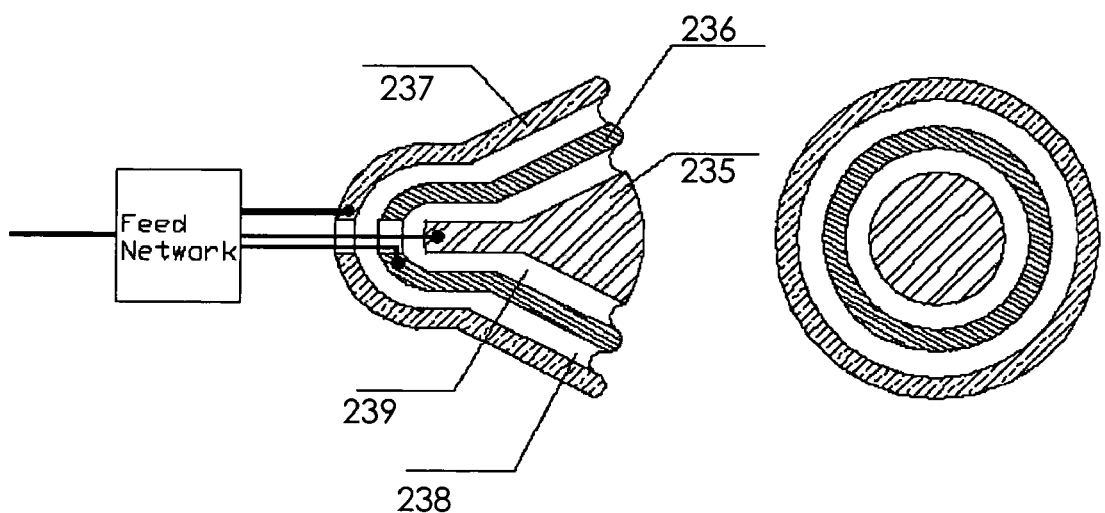
FIG. 13b shows the Antenna For TM03 Mode

FIG. 13b depicts the views of the cross sections of the side and the front of an antenna for generating TM03 mode which corresponds to the field configuration for the TM03 as depicted in FIG. 11 The inner conductor 230 is separated from the intermediate conductor 236 via insulator 239 and the outer conductor 237 is separated from intermediate conductor 236 via the insulator 238. The conductors 235 and 236 and 237 are fed with a feed network.

FIG. 14 shows the Field Configurations for $TE^z$ modes in a coaxial waveguide brought here from ref [3]. FIG. 15a shows the Field configurations for $TM^z$ modes in a coaxial waveguide brought here from ref [3]. FIG. 15b shows the Field configurations for $TM^z$ modes in a circular wave-guide brought here from ref [3]

Figure 16:
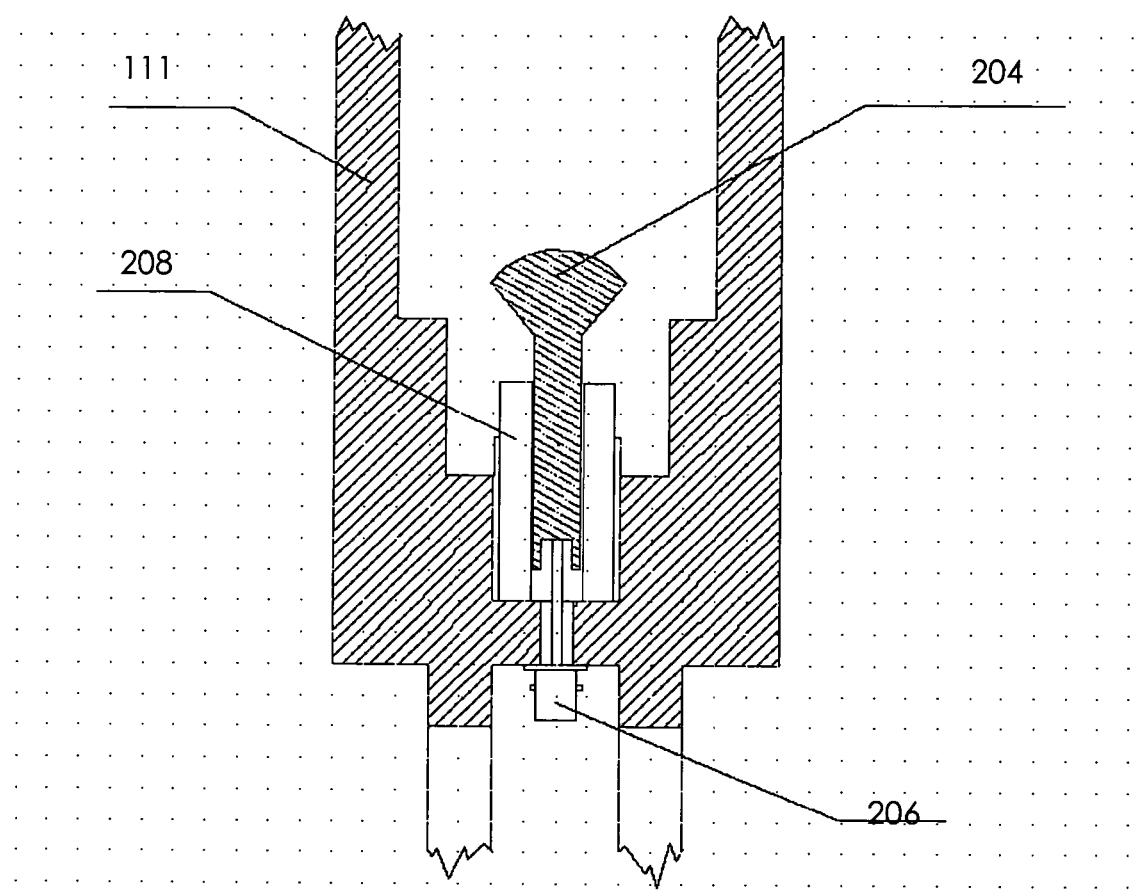
FIG. 16 shows a End-Fed Antenna

FIG. 16 shows a End-Fed Antenna. This type of implementation is appropriate for the type of cylinders which have two flanges on the end cap and the connector 206 is attached to the cylinder 111 and feeds the antenna 204 from the space between the hinges. The antenna 204 is separated from the cylinder 11 via insulator 208.

Figure 17:
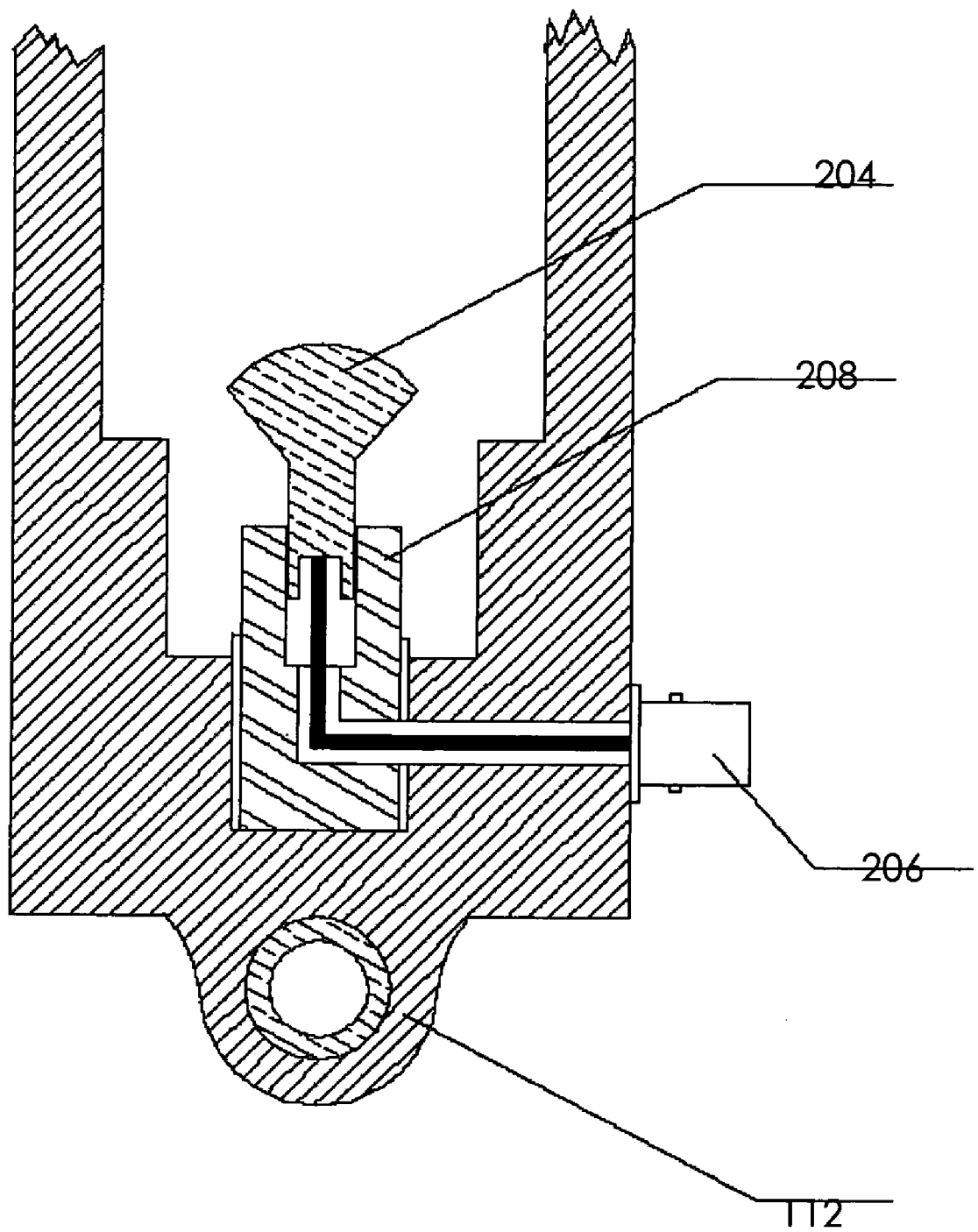
FIG. 17 shows a Side Fed Antenna

FIG. 17 shows a Side Fed Antenna. This type of implementation is appropriate for the type of cylinders which have one flange on the end cap 112 which is at the center of the end cap and the preferable approach is to attach and the connector 206 to the cylinder 111 and from the side which feeds the antenna 204 from the space away from the hinge. The antenna 204 is separated from the cylinder 11 via insulator 208

Figure 18:
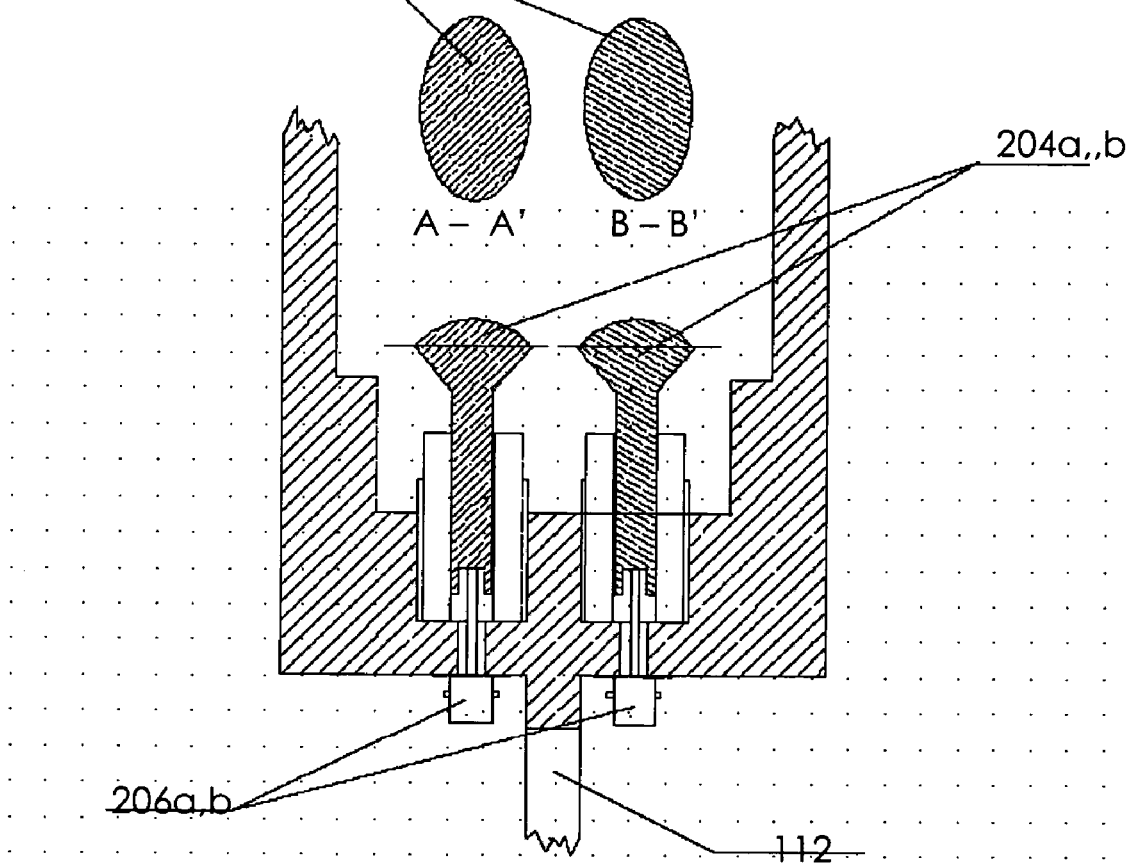
FIG. 18 shows an End Fed Antenna Implementation For $TM_{11}$ Mode
Figure 19:
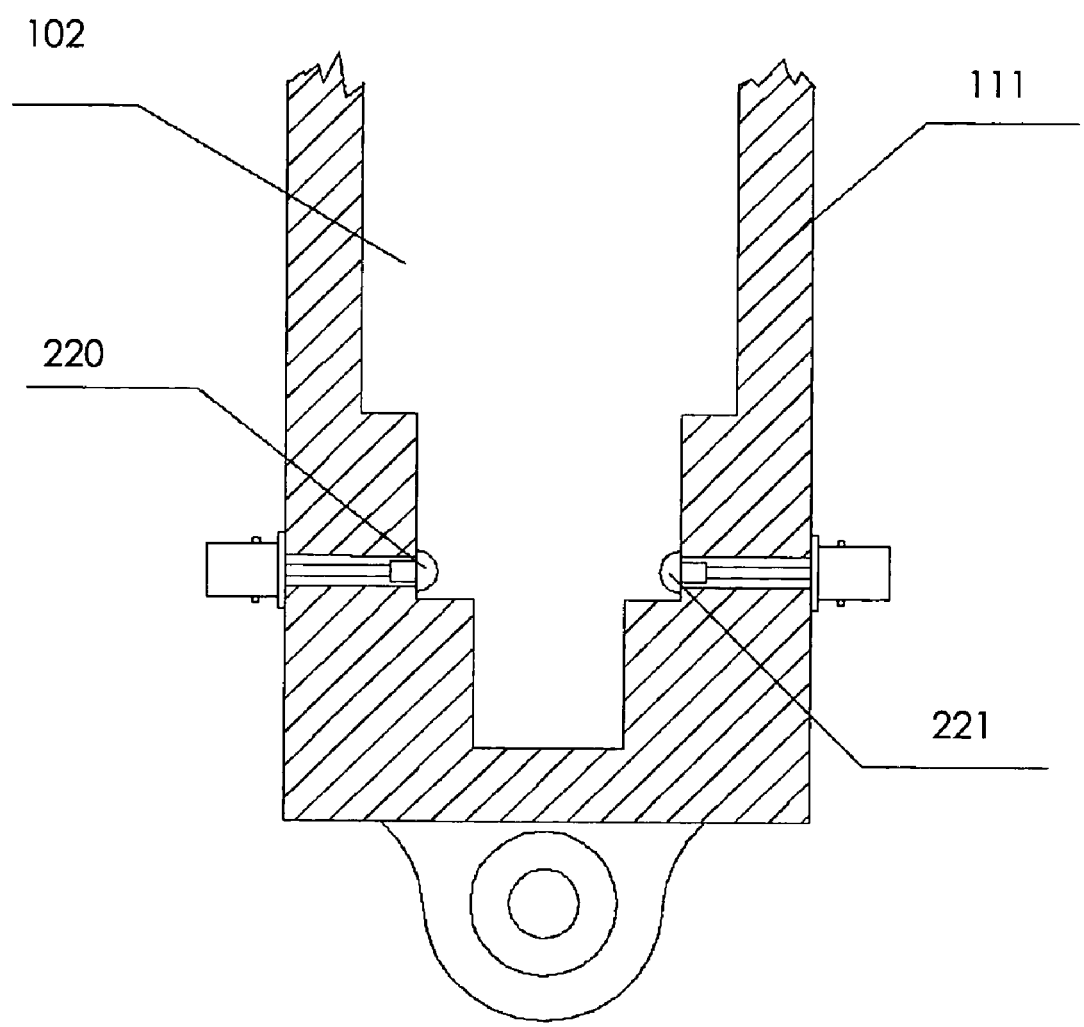
FIG. 19 shows a Cylinder with Temperature and Pressure Sensors

FIG. 18 shows an End Fed Antenna Implementation For $TM_{11}$ Mode of two speate antennas 204 which consists FIG. 19 shows a Cylinder 111 with Temperature sensor 220 and Pressure sensor 221 Sensors installed on the cylinder. The temperature and pressure change the electrical properties of the hydraulic/pneumatic fluid 102. The data for relative permitivitty $\epsilon_r = \epsilon' - j\epsilon''$ versus pressure and temperature is the table and as necessary is looked up by the computer/digital processor in order to maintain the accuracy of the measurements as pressure and temperature changes due to factors such as friction load and the surrounding environments.

Figure 20:
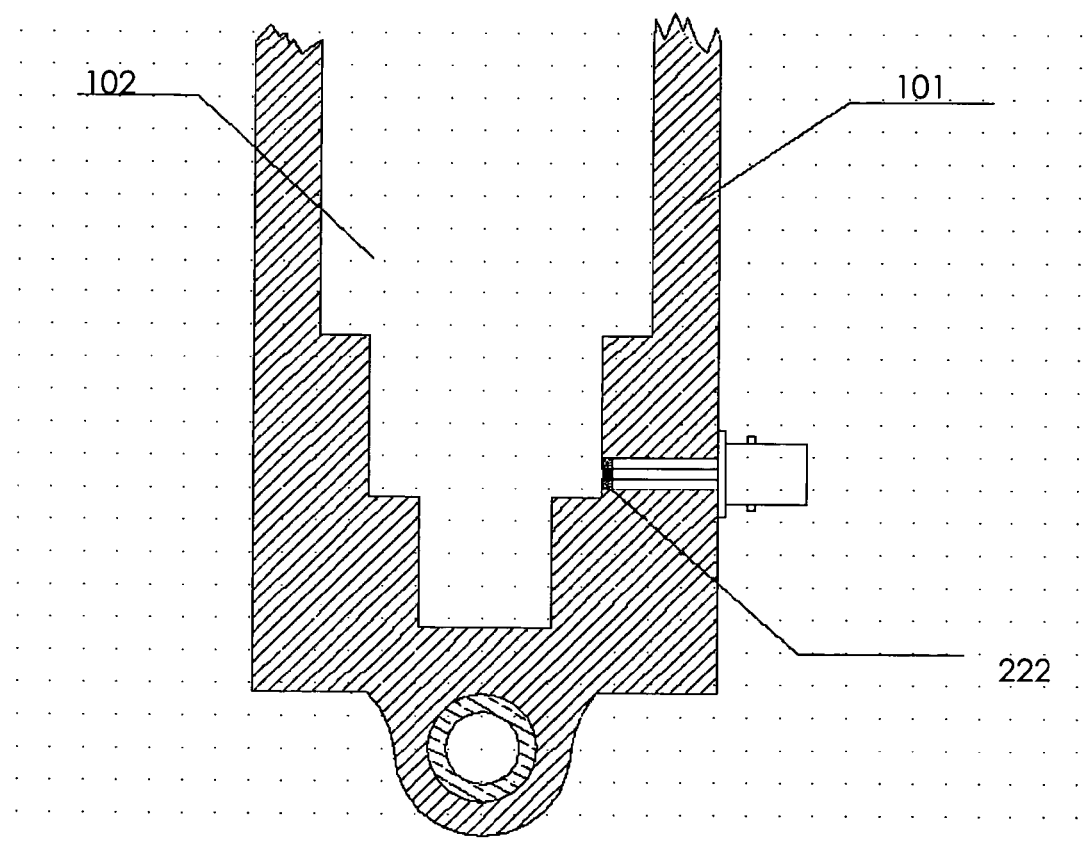
FIG. 20 shows a Cylinder with sensor for measuring relative dielectric constant $\in_r$ and $\in_r'$ (loss tangent)

Alternatively, as in FIG. 20 the cylinder 101 is equipped with sensor for measuring relative dielectric constant $\epsilon_r = \epsilon' - j\epsilon''$ of the fluid 102 directly. This type of sensor could be implemented by using a capacitor in which the fluid penetrates between its plates.

Figure 21:
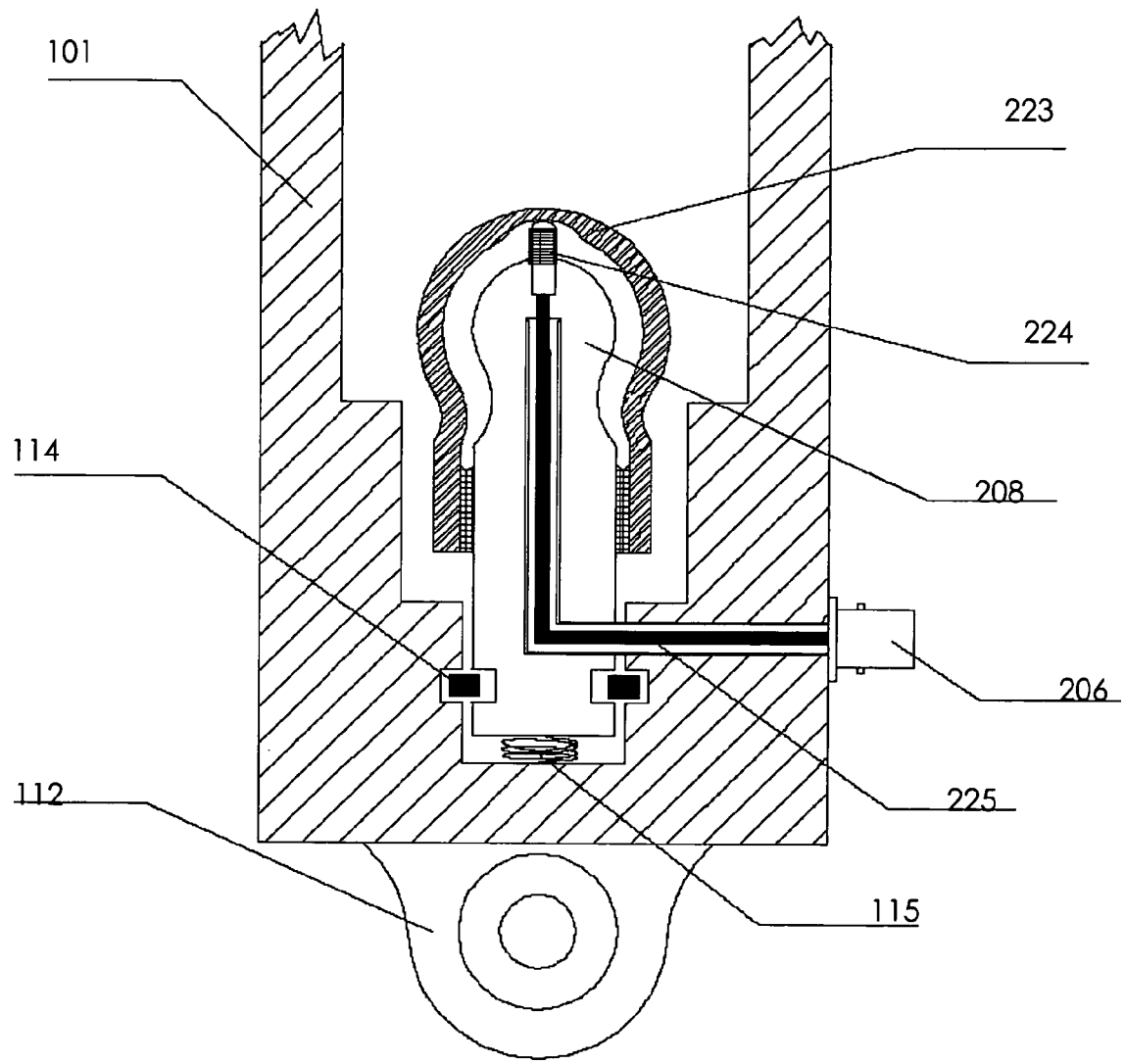
FIG. 21 shows a Side-Fed Antenna
Figure 22:
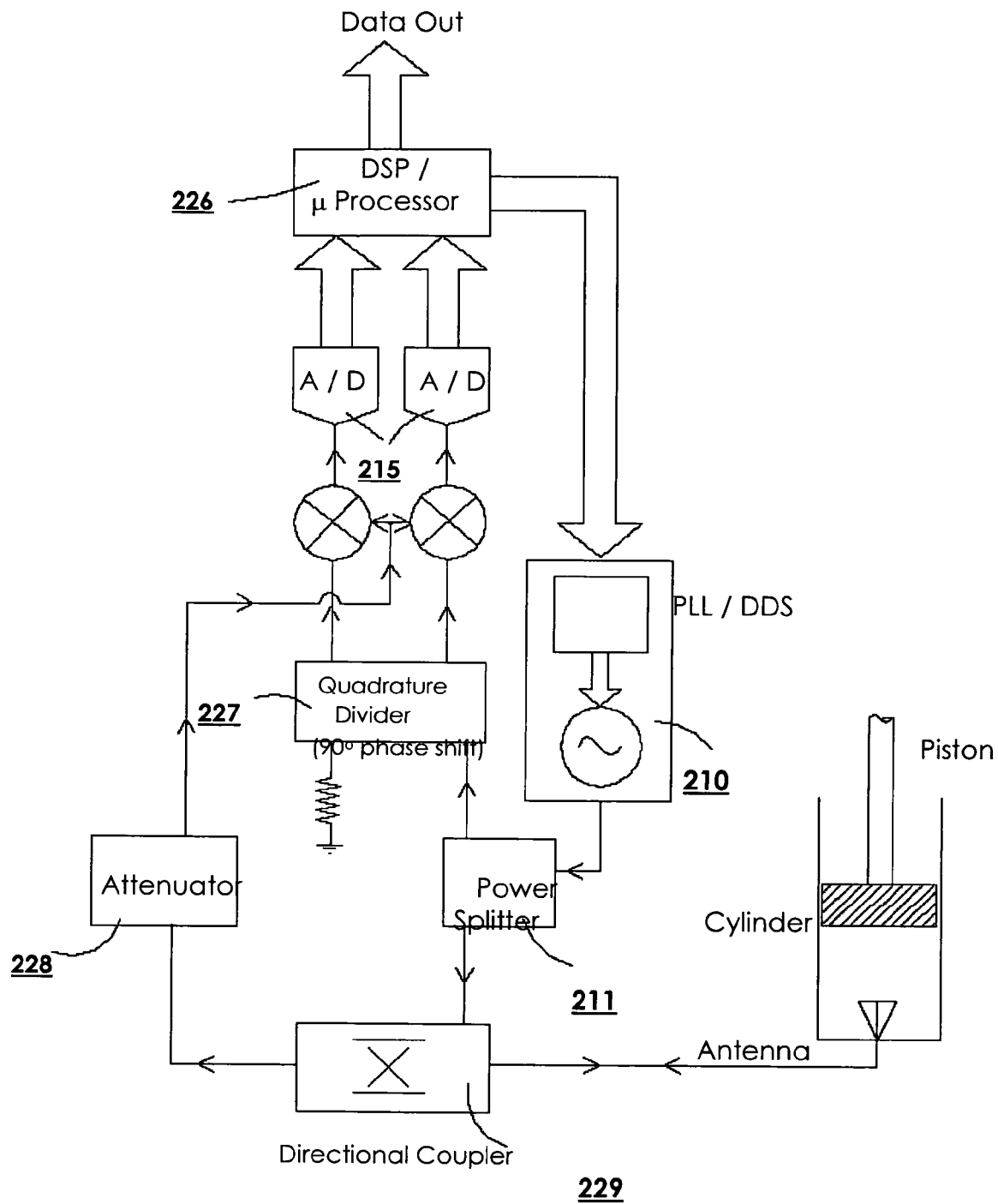
FIG. 22 shows a Typical System Diagram One-Port Network Analyzer

FIG. 21 depicts another Side-Fed Antenna configuration in which the radiating portion of the antenna 223 is mounted on an insulator 208 a coaxial line feeds the signal from connector 206 to the antenna 223 via flexible contact 208. One possible method of securing the insulator 208 to the cylinder 101 is by cutting annular notches in the cylinder 101 and insulator 208. A spring washer 114 is inserted in the annular notch of the insulator 208. Spring 115 is placed on the buttom of cylinder 101. The washer 114 is squeezed and the insulator is inserted in the cylinder and as the washer 114 reaches the notch in the cylinder 101 it expands and secures the insulator 208 in place.

FIG. 23 depictss an actual antenna with tapersd end installed in an end cap.

Figure 24:
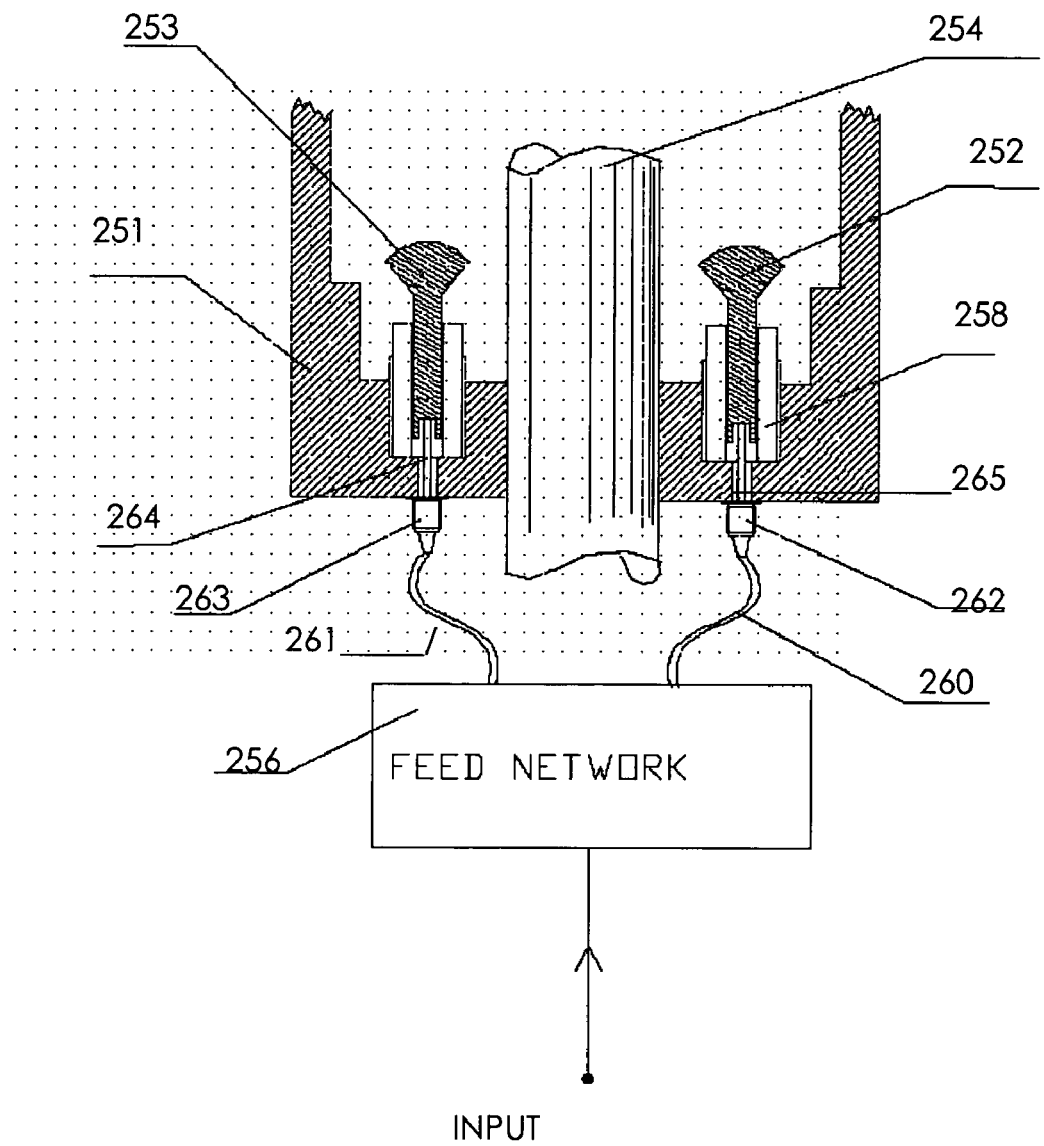
FIG. 24 shows a Typical antenna structure for antenna installed in the end cap which contains the piston arm.

FIG. 24 depicts a typical structure of antenna installed in the end cap 251 when a piston arm 254 is present. The signal is provided to the two radiators 252 and 253 by means of a feed network 256. The radiators 253 and 254 are separated from the end cap 251 by insulators 258. The feed network 256 functions as a two way power splitter and its outputs is connected to the antennas via cables 260 and 261 and connectors 262 and 263 flexible connecting rods 264 and 265. This arrangement produces $TM_{11}$ mode which is referred to $E_{11}$ in reference [3] as its field configuration are depicted in FIG. 15a. As seen in FIG. 15a the field configuration for $E_{11}$ has two nodes corresponding to the tips of radiators 253 and 254. The antenna system as described in FIG. 24 produces field configuration $E_{11}$ as in FIG. 15a. However, in order to obtain higher order modes more number radiators is necessary for example by using four radiators produces four nodes corresponding to $E_{21}$ mode, i.e., as field configuration $E_{21}$ as in FIG. 15a. the advantage of higher order modes is the radiator rods are shorter and would not take as much space. Cylinders with double end rod construction require such antenna due to the fact that both ends contain a piston arm. However, in any event such antenna system can be utilized in a in a single end rod cylinders in the rod side.

Calibration

In order to improve the measurement accuracy a calibration procedure for reducing the unwanted characteristics of the antenna as well as the other components of the system is performed. The one port network analyzer also goes through a calibration procedure with short, open and termination as done in lab equipment In on method the data collected data versus actual measurements are saved in a table and is used as table took up for interpolation. In another method the effects measurements of the antenna characteristics and the other RF components are calibrated out of the measurements.

REFERENCE

[1] Charles S. Hedges, *Industrial Fluid Power Volume 1*, Third Edition (1984).
[2] C. A. Balanis, *Advanced Engineering Electromagnetics*, pp. 470–491 (1989)
[3] Nathan Marcuvitz, *Waveguide Handbook* (1986)

What is claimed is:

1. A system for measurement of piston displacement in a fluid filled cylinder, said system comprising:
   an antenna, disposed at one end of said cylinder; and
   a signal source configured to generate an electronic signal which is coupled to the cylinder such that said signal reflected off of said piston is measured at said antenna, whereby the distance said piston is from said antenna is determined using the slope of the phase angle of the reflection coefficient versus the frequency.

2. A system as claimed in claim 1, wherein said reflection coefficient is the voltage reflection coefficient.

3. A system as claimed in claim 1, wherein said slope of the phase angle with respect to frequency is the derivative of the phase with respect to the frequency indicated by the equation:

$$\phi'_r = \frac{\partial \phi_r(d, f)}{\partial f}$$

4. The system as claimed in claim 1, wherein a corrected slope of the phase angle is a ratio of a given phase difference to the corresponding corrected frequency difference calculated by incorporating correction factors by dividing the frequency to its corresponding phase velocity using the equation.

$$d = \frac{\phi_r(d, f_2) - \phi_r(d, f_1)}{\frac{4\pi f_1}{v_{pz,mn}(f_1)} - \frac{4\pi f_2}{v_{pz,mn}(f_2)}}.$$

5. A system as claimed in claim 1, wherein the slope of the phase angle of the reflection coefficient versus the frequency may be substituted by a related group delay, said group delay being related to said slope of the phase angle by a factor of $-1/2\pi$ or substantially $-0.159$.

6. A system as claimed in claim 5, wherein said group delay is defined by the following equation:

$$t_{gd} = -\frac{\partial \phi_r}{2\pi \partial f}.$$

* * * * *